United States Patent
Hogan

(10) Patent No.: US 12,441,547 B1
(45) Date of Patent: Oct. 14, 2025

(54) DIRECT DROP-OFF AND PICK-UP FOR CONTAINER TRANSFER

(71) Applicant: Amazon Technologies, Inc., Seattle, WA (US)

(72) Inventor: Scott Hogan, Mukilteo, WA (US)

(73) Assignee: Amazon Technologies, Inc., Seattle, WA (US)

( * ) Notice: Subject to any disclaimer, the term of this patent is extended or adjusted under 35 U.S.C. 154(b) by 738 days.

(21) Appl. No.: 17/845,195

(22) Filed: Jun. 21, 2022

(51) Int. Cl.
*G06F 7/00* (2006.01)
*B65G 1/137* (2006.01)

(52) U.S. Cl.
CPC .................... *B65G 1/1375* (2013.01)

(58) Field of Classification Search
CPC .... B65G 1/1375; B65G 1/00; B65G 2209/00; B65G 61/00; B65G 57/00; B65G 59/00; B65G 60/00; G05D 2107/70; G05D 2201/0216; G06Q 10/08; G06Q 10/083; G06Q 10/087; G06K 2017/0048; G06K 2017/0051; B25J 9/00; B25J 15/00
USPC ......................... 700/213–216, 218
See application file for complete search history.

(56) References Cited

U.S. PATENT DOCUMENTS

| | | | |
|---|---|---|---|
| 8,965,562 | B1 | 2/2015 | Wurman et al. |
| 9,111,251 | B1 | 8/2015 | Brazeau |
| 9,389,609 | B1 | 7/2016 | Mountz et al. |
| 9,688,472 | B1 | 6/2017 | Stubbs et al. |
| 10,471,597 | B1 | 11/2019 | Murphy et al. |
| 10,958,895 | B1 | 3/2021 | Krishnan Gorumkonda |
| 11,130,242 | B1 | 9/2021 | Kalm et al. |
| 11,556,879 | B1 | 1/2023 | Timmons et al. |
| 2013/0173049 | A1 | 7/2013 | Brunner et al. |
| 2014/0100715 | A1 | 4/2014 | Mountz et al. |
| 2014/0100998 | A1 | 4/2014 | Mountz et al. |
| 2019/0291282 | A1 | 9/2019 | Marchese et al. |

FOREIGN PATENT DOCUMENTS

| | | | | |
|---|---|---|---|---|
| DE | 19517804 C2 | * | 5/1996 | ............... B66F 9/181 |
| JP | 2022022157 A | * | 2/2022 | ............... B65G 1/04 |
| KR | 102319364 B1 | * | 10/2021 | ............... B66F 9/183 |
| SG | 145664 A1 | * | 9/2008 | ........ H01L 21/67769 |
| WO | WO-2018192490 A1 | * | 10/2018 | ............... B65G 59/00 |

OTHER PUBLICATIONS

U.S. Appl. No. 17/489,267, "End of Arm Tool Inserter and Extractor," filed Sep. 29, 2021, 50 pages.
U.S. Appl. No. 17/845,173, "Pendulum Queue," filed Jun. 21, 2022, 69 pages.

* cited by examiner

*Primary Examiner* — Yolanda R Cumbess
(74) *Attorney, Agent, or Firm* — Kilpatrick Townsend & Stockton LLP

(57) ABSTRACT

A transfer apparatus can include a laterally movable frame moveable in a lateral direction, an upright frame supported by the laterally movable frame, and a header movably coupled to the upright frame and configured to move in a vertical direction. The header can include an extractor. The header can also include a claw assembly configured to open and close. The extractor can pull an item over the claw assembly in a closed state, and the claw assembly can open for releasing the item over a carrier.

20 Claims, 26 Drawing Sheets

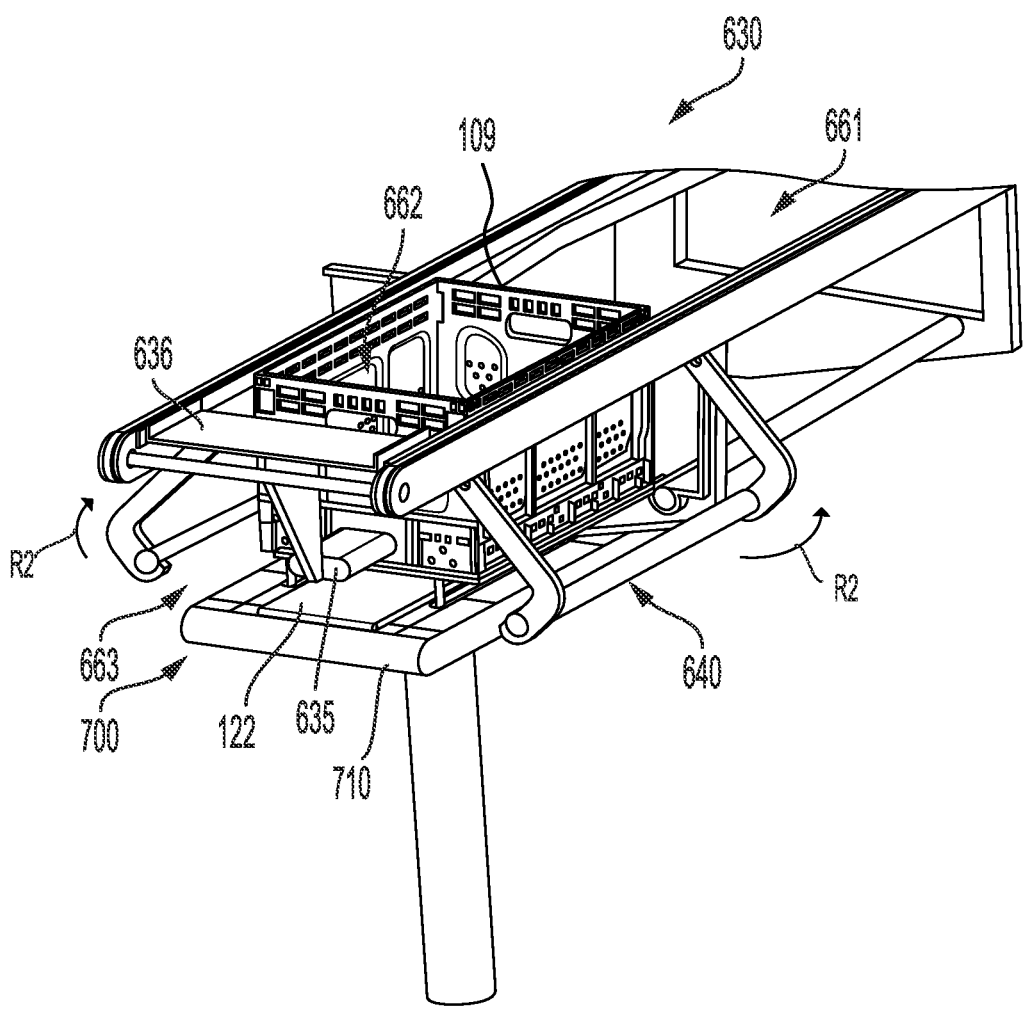
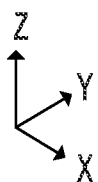
FIG. 8A

DIRECT DROP-OFF AND PICK-UP FOR CONTAINER TRANSFER

CROSS-REFERENCE TO RELATED APPLICATIONS

This application is related to U.S. patent application Ser. No. 17/845,173, filed Jun. 21, 2022, entitled "PENDULUM QUEUE," which is hereby incorporated by reference herein in its entirety.

BACKGROUND

Inventory systems, such as those in warehouses, supply chain distribution centers, airport luggage systems, and custom-order manufacturing facilities, face significant challenges in storing inventory items. As the amount of inventory stored at a single location continues to grow, inefficient utilization of system resources, including space, equipment, and manpower, can result in lower throughput, unacceptably long response times, an ever-increasing backlog of unfinished tasks, and, in general, poor system performance. Additionally, once an inventory storage location has been filled to capacity with items and equipment, the cost of adding additional space or moving the items and equipment to a secondary location may be prohibitively expensive, limiting the ability of the location to accommodate additional items.

BRIEF DESCRIPTION OF THE DRAWINGS

Various embodiments in accordance with the present disclosure will be described with reference to the drawings, in which:

FIG. 8A illustrates an example of the header of FIG. 7A in an open state in accordance with various embodiments;

DETAILED DESCRIPTION

Figure 1:
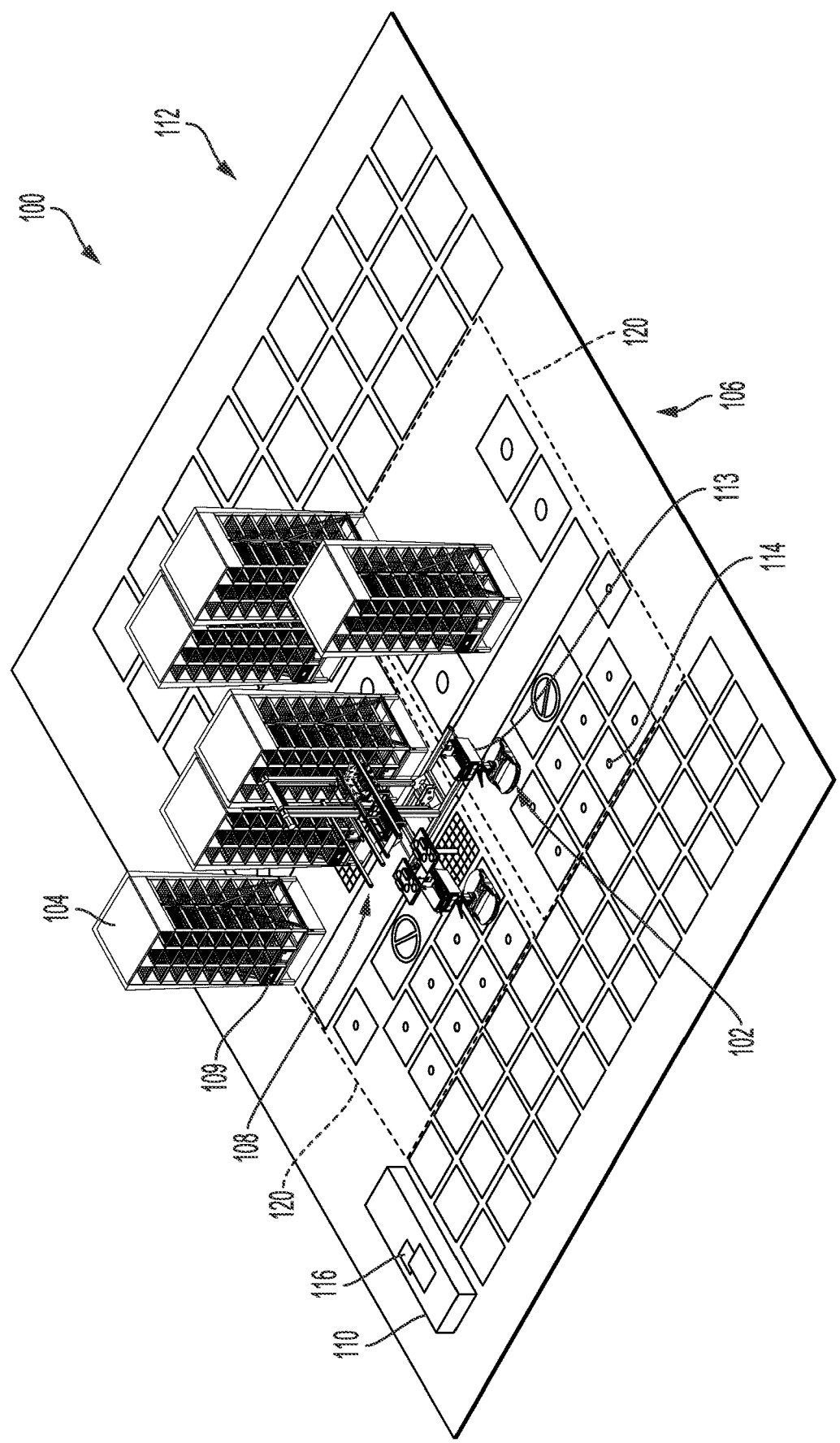
FIG. 1 illustrates a perspective view of an example of an inventory system in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments herein are directed to inventory systems, for example, inventory systems for transporting and sorting items. Items may be stored in inventory holders. The inventory holders can include shelves and/or compartments for receiving items or containers with items therein. The inventory holders and/or other system components may be moved by mobile drive units (e.g., a fleet of mobile drive units) that can move around a warehouse environment, for example. Items may be transported (e.g., within inventory holders, containers, etc.) to stations. For example, at stations, the items may be consolidated into groups to fulfill customer orders and/or otherwise be processed for subsequent operations.

In various embodiments, the inventory system may include areas organized into queues to facilitate processing. For example, queues may be arranged to allow items to be accessed from inventory holders in one part of the queue and transferred to mobile drive units or other carriers in another part of the queue. The respective portions of the queue may be accessible by a robotic assembly or other transfer apparatus to effectuate the transfer of items from one portion of the queue to another. In various embodiments, the transfer apparatus may be movable between two different queues. For example, the transfer apparatus may perform an item swapping task in one queue while inventory holders and carriers are cycled within another queue. The cycling may arrange elements in a suitable position for subsequent swapping activity by the transfer apparatus. As a result of the transfer apparatus being able to work in one queue while the other queue is being prepared for additional swapping activity, inactive time and/or down time for the transfer apparatus may be reduced and lead to increased throughput of the inventory system, for example.

As an illustrative example, the transfer apparatus may include a laterally movable frame moveable in a lateral direction, an upright frame supported by the laterally movable frame, and a header movably coupled to the upright frame to move in a vertical direction. Respective parts of the transfer apparatus can move to align the header with a tote or other item within an inventory holder. The header can include a suction cup or other extractor that can be actuated to extract the item from an inventory holder. The extractor can pull the item over a claw assembly that may also be part of the header. The extractor may position the item over the claw assembly in a closed state of the claw assembly. The header can be moved to a position directly over a mobile drive unit or other carrier, and the claw assembly can be opened to deposit the item onto the carrier. The header can also be utilized for pick up purposes. For example, another carrier may bring a second item into a pick-up location at which the claw can close below the underside of the second item. With the claw supporting the second item, the extractor can push the second item from along the top side of the claw and along the header to move the second item into the inventory holder (such as into the space previously vacated by the first extracted item).

Advantageously, the transfer apparatus can facilitate a fast pick up and a direct drop off from a bottom open portion of the header through use of the claw assembly. For example, the direct drop off may facilitates faster item transfer within a queue. The transfer apparatus can be employed to move back-and-forth between queues to improve an item transfer time. For example, the transfer apparatus can advantageously allow item transfer within the first queue and simultaneous cycle inventory holders and carriers in the second queue so that the transfer apparatus can quickly translate to the second queue to quickly transfer a second item in the second queue. This way, a total item transfer time can be substantially improved in an inventory system. The transfer time can be further improved by using a two-header configuration of the transfer item to facilitate simultaneously pick and drop off items at the same time.

Referring now to the drawings, in which similar identifiers refer to similar elements, FIG. 1 illustrates a perspective view of an example of an inventory system 100, according to embodiments. The inventory system 100 can move inventory items between locations within a warehouse (e.g., workspace 112). For example, the inventory system 100 can facilitate the entry, processing, and/or removal of inventory items from the inventory system 100 and the completion of other tasks involving the inventory items. The inventory system 100 can include one or more mobile drive units 102 (e.g., a fleet of mobile drive units 102) (also referred to as autonomous vehicles, autonomous surface vehicles, autonomous robotic vehicles, mobile drive units, unmanned aerial vehicles, etc.), one or more inventory holders 104, one or more inventory stations 106, one or more transfer apparatuses 108, and/or a management module 110. The components of the inventory system 100 may operate within a workspace 112.

The inventory holders 104 and/or other components of the system 100 may be moved among locations within the workspace 112 by mobile drive units 102 or may include other forms of suitable propulsion systems. In some embodiments, mobile drive units 102 may include or be carriers 113 capable of carrying containers or other items individually or in groups within the workspace 112. In some embodiments, carriers 113 may be transported and/or correspond to portions of other structures, such as conveyors or other components capable of transporting.

The mobile drive units 102 (e.g., each drive unit) can transport the inventory holders 104 between locations within a workspace 112. For example, each mobile drive unit 102 can transport one or more inventory holders 104. The mobile drive units 102 can transport the inventory holders 104 in response to commands communicated by the management module 110. The inventory holders 104 can be carried, rolled, and/or otherwise moved by the mobile drive units 102.

In various embodiments, the inventory holders 104 can store inventory items of the inventory system 100. For example, the inventory holders 104 can include multiple storage bins with each storage bin capable of holding one or more types of inventory items. The inventory holders 104 can include one or more spaces (e.g., cubbies, shelves, slots, etc.) that can receive one or more types of inventory items. The inventory holders 104 may include items within totes, boxes, bags, or other forms of containers 109.

The inventory items represent any objects suitable for storage, retrieval, and/or processing in the inventory system 100. For example, inventory items can be or include one or more objects of a particular type that are stored in the inventory system 100. In further embodiments, a particular inventory holder 104 can store a particular inventory item if the inventory holder 104 currently holds one or more of the same item type.

Turning to a particular example, the inventory system 100 can represent a mail-order or other order-fulfillment warehouse facility, and inventory items can represent merchandise stored in the warehouse facility. During operation, the mobile drive units 102 can carry an inventory holder 104 containing one or more inventory items that are requested in an order to be packed for delivery to a customer. Alternatively or additionally, the inventory holder 104 may contain aggregated collections of inventory items for shipment. Moreover, in particular embodiments of the inventory system 100, boxes containing completed orders may themselves represent inventory items.

The mobile drive units 102 can be or include any suitable devices and/or components appropriate for use in the inventory system 100. For example, the mobile drive units 102 can include components based on the characteristics and configuration of the inventory holders 104 and/or other elements of the inventory system 100. In some embodiments of the inventory system 100, the mobile drive units 102 can be or include autonomous robotic vehicles that can move about the workspace 112. One or more of the mobile drive units 102 can be equipped with sensors (e.g., a stereo camera), which may enable the drive unit(s) to detect obstacles (e.g., items or objects) and alert human operators to the location of the obstacles, so that the obstacles can be removed.

Figure 2:
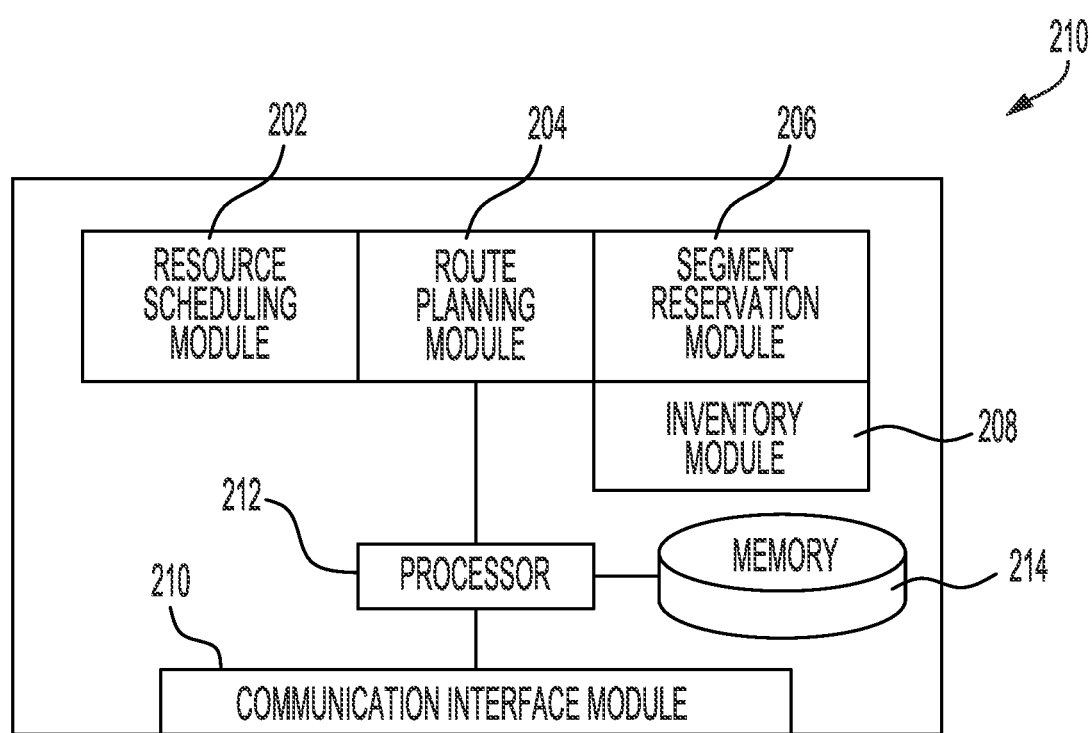
FIG. 2 is a block diagram illustrating an example of a management module that may be utilized in the inventory system shown in FIG. 1 in accordance with various embodiments.

In various embodiments, (e.g., as shown in FIG. 2) the mobile drive units 102 can include one or more sensors 218. The sensors 218 can detect various objects in the workspace 112. For example, the sensors 218 can detect inventory items, inventory holders 104, transfer apparatuses 108, other mobile drive units 102, inventory stations 106, and/or individuals in the workspace 112. The sensors 218 can be or include a camera, Lidar, a color sensor, a cliff sensor radar, a proximity sensor, an impact sensor, a magnetic sensor, an electrical sensor, a color sensor, a cliff sensor, an electromagnetic sensor (e.g., to detect electromagnetic field intensity and/or orientation), a brightness sensor, a spectrometer, a photometer, and/or any suitable sensors for detecting objects in the workspace 112.

In various embodiments, one or more fiducials 114 (e.g., fixed navigation anchors) can be positioned in the workspace 112 (e.g., on the floor, ceiling, and/or wall of the workspace 112). The fiducials 114 can be used for navigation (e.g., provide navigational references and/or directions to the mobile drive units 102). The fiducials 114 can additionally or alternatively be used to demarcate different regions (e.g., different functional regions within the workspace 112). In further embodiments, the fiducials 114 can include a calibration fiducial positioned in a calibration region and used to identify a calibration position (e.g., a position that is a known distance and/or angular position relative to a calibration fixture to provide readings that can facilitate calibration of the mobile drive units 102). The fiducials 114 can be or include stickers, markers, markings, and/or physical objects (e.g., an alignment pin).

In various embodiments, the mobile drive units 102 can operate without human intervention in a structured area (e.g., using the fiducials 114). For examples, the fiducials 114 can be detected by sensors on the mobile drive units 102 to aid in the navigation of the mobile drive units 102 around the workspace 112.

In further embodiments, the mobile drive units 102 can additionally or alternatively operate without human intervention in an unstructured area (or field) that does not contain fiducials. For example, the mobile drive units 102 can be equipped with autonomous navigation functions and/or sensors 218 that enable the mobile drive unit 102 to maneuver within the workspace 112 without the use of fiducials.

The workspace 112 can represent an area associated with the inventory system 100. For example, the workspace 112 can be a place in which the mobile drive units 102 can move and/or in which the inventory holders 104 can be stored. In various embodiments, the workspace 112 can represent some or all of the floor of a warehouse environment in which the inventory system 100 operates.

Although FIG. 1 shows, for the purposes of illustration, an embodiment of the inventory system 100 in which the workspace 112 includes a fixed, predetermined, and finite physical space, particular embodiments of the inventory system 100 may include mobile drive units 102 and/or inventory holders 104 that are configured to operate within a workspace 112 that is of variable dimensions and/or of an arbitrary geometry. Similarly, while FIG. 1 illustrates a particular embodiment of the inventory system 100 in which the workspace 112 is entirely enclosed in a warehouse environment, alternative embodiments can utilize the workspace 112 in which some or all of the workspace 112 is located, for example, outdoors, within a vehicle (such as a cargo ship), and/or otherwise unconstrained by any fixed structure.

The management module 110 can assign tasks to appropriate components of the inventory system 100 and/or can coordinate operation of the various components of the inventory system 100 in completing the tasks. These tasks can relate to the movement and processing of inventory items and/or to the management and maintenance of the components of the inventory system 100. For example, the management module 110 can assign portions of the workspace 112 for "parking" the mobile drive units 102, for example, for recharging and/or replacing batteries of the mobile drive units 102. The management module 110 can additionally or alternatively assign a portion of the workspace 112 for the storage of empty inventory holders 104 and/or any other operations associated with the functionality supported by the inventory system 100 and its various components.

In various embodiments described herein, the management module 110 can instruct movement and/or operation of inventory holders 104. For example, the management module 110 can instruct the mobile drive units 102 to move inventory holders 104 to suitable locations for interacting with transfer apparatuses 108. The management module 110 may provide instructions for causing actuation of components of the transfer apparatuses 108 suitable for manipulating containers 109 and/or items relative to inventory holders 104. The management module 110 may provide instructions to the transfer apparatus 108 directly or via the mobile drive units 102, for example.

The management module 110 may select components of the inventory system 100 to perform the tasks and communicate appropriate commands and/or data to the selected components to facilitate completion of the various operations. For example, the management module 110 can generate and transmit task assignments 116 to the selected components to trigger completion of the relevant tasks. Each task assignment 116 can include one or more tasks to be completed by a particular component. For example, the tasks can be or include the retrieval, storage, replenishment, and/or the counting of inventory items and/or the management of the mobile drive units 102, the inventory holders 104, the transfer apparatuses 108, and/or components of the inventory system 100. Depending on the component and task to be completed, a particular task assignment 116 can identify locations, components, and/or actions associated with the corresponding task and/or any other appropriate information to be used by the relevant component in completing the assigned task.

Although shown in FIG. 1 as a single, discrete component, the management module 110 can represent multiple components and/or can represent or include portions of the mobile drive units 102 and/or other elements of the inventory system 100. Accordingly, any or all of the functionality of the management module 110 that is described herein may, in particular embodiments, represent functionality of a mobile drive unit 102 (e.g., a controller within the mobile drive unit 102).

In further embodiments, the management module 110 can select a mobile drive unit 102, inventory holder 104, transfer apparatus 108, or other unit of the inventory system 100 to assign the relevant task based on the location or state of the selected unit, an indication that the selected unit has completed a previously-assigned task, a predetermined schedule, and/or any other suitable consideration. These destinations can be associated with an inventory request that the management module 110 is executing and/or a management objective that the management module 110 is attempting to fulfill. For example, the task assignment can define the location of an inventory holder 104 to be accessed, a transfer apparatus 108 to be utilized, an inventory station 106 to be visited, a storage location where the mobile drive unit 102 should park until receiving another task, or a location associated with any other task appropriate based on the configuration, characteristics, and/or state of the inventory system 100, as a whole, or individual components of the inventory system 100.

As part of completing various task assignments 116, the mobile drive units 102 can move the inventory holders 104 and/or other components between locations within the workspace 112. For example, the mobile drive units 102 can couple with and transport the inventory holders 104 within the workspace 112.

The management module 110 can communicate with various components of the inventory system 100. For example, the management module 110 can communicate to receive information identifying selected inventory holders 104, to transmit the locations of the mobile drive units 102, to transmit image data for images of fiducials 114 captured by the mobile drive units 102, and/or to exchange any other suitable information to be used by the management module 110 the mobile drive units 102, and/or other elements of the inventory system 100 during operation. The management module 110 can communicate with the components of the inventory system 100 (e.g., the mobile drive units 102, inventory holders 104, etc.) wirelessly, using wired connections, and/or in any other appropriate manner. Additionally or alternatively, the mobile drive units 102 can communicate with inventory holders 104 and/or other components of the inventory system 100 and/or with one another wirelessly, using wired connections, and/or in any other appropriate manner.

In various embodiments, components of the inventory system 100 can communicate using IEEE 802.11, Bluetooth, or Infrared Data Association (IrDA) standards, or any other appropriate wireless communication protocol. Additionally or alternatively, the inventory system 100 can include tracks or other guidance elements upon which the mobile drive units 102 can be wired to facilitate communication between the mobile drive units 102, between the management module 110 and the mobile drive units 102, and/or between the components of the inventory system 100. In general, the mobile drive units 102 can be powered, propelled, and controlled in any manner appropriate based on the configuration and characteristics of the inventory system 100.

The inventory stations 106 can represent locations designated for the completion of particular tasks involving inventory items. For example, the tasks can include the removal of inventory items from the carriers 113 and/or the inventory holders 104, the introduction of inventory items into the carriers 113 and/or the inventory holders 104, the counting of inventory items in the carriers 113 and/or the inventory holders 104, the decomposition of inventory items (e.g., separating from pallet-sized or case-sized groups into individual inventory items), the consolidation of inventory items between the inventory holders 104 and/or the carriers 113, and/or the processing or handling of inventory items in any other suitable manner.

In some embodiments, one or more inventory stations 106 can represent a location at which the inventory system 100 is externally accessible by human operator(s) and/or robotic system(s) external to the inventory system 100. In some embodiments, the workspace 112 can be externally bounded by walls and/or a fence to prevent or limit access to the workspace 112 by human operator(s) (e.g., a structured environment), and each of the inventory stations 106 is arranged at a respective opening in the walls or fence. In some embodiments, the workspace 112 is not externally bounded (e.g., an unstructured environment). In further embodiments, the inventory system 100 can allow both mobile drive units 102 and human operator(s) to navigate through the workspace 112 and interact with various components of the inventory system 100.

The workspace 112 can include one or more queues 120 in which components of the inventory system 100 may be organized and/or sequenced to facilitate processing operations. Queues 120 may be arranged at stations 106, for example. In various embodiments, multiple queues 120 can be arranged alongside one another. As an example, FIG. 1 shows two queues 120 positioned laterally relative to one another.

Turning to FIG. 2, a particular embodiment of the management module 110 is shown in greater detail that may be utilized in particular embodiments of the system or architecture shown in FIG. 1. As shown, the example embodiment includes a resource scheduling module 202, a route planning module 204, a segment reservation module 206, an inventory module 208, a communication interface module 210, a processor 212, and a memory 214. The management module 110 can represent a single component, multiple components located at a central location within inventory system 100, or multiple components distributed throughout inventory system 100. For example, the management module 110 may represent components of one or more mobile drive units 102 that are capable of communicating information between the mobile drive units 102 and coordinating the movement of mobile drive units 102 within workspace 112. In general, management module 110 may include any appropriate combination of hardware and/or software suitable to provide the described functionality.

The processor 212 is operable to execute instructions associated with the functionality provided by management module 110. The processor 212 can comprise one or more general purpose computers, dedicated microprocessors, or other processing devices capable of communicating electronic information. Examples of the processor 212 include one or more application-specific integrated circuits (ASICs), field programmable gate arrays (FPGAs), digital signal processors (DSPs) and any other suitable specific or general purpose processors.

The memory 214 can store processor instructions, inventory requests, reservation information, state information for the various components of inventory system 100 and/or any other appropriate values, parameters, or information utilized by management module 110 during operation. The memory 214 can represent any collection and arrangement of volatile or nonvolatile, local or remote devices suitable for storing data. Examples of the memory 214 may include, but are not limited to, random access memory (RAM) devices, read only memory (ROM) devices, magnetic storage devices, optical storage devices or any other suitable data storage devices.

The resource scheduling module 202 can process received inventory requests and generate one or more assigned tasks to be completed by the components of inventory system 100. The resource scheduling module 202 can additionally or alternatively include one or more appropriate components for completing the assigned tasks and, using communication interface module 210, communicate the assigned tasks to the relevant components. Additionally, the resource scheduling module 202 can also be responsible for generating assigned tasks associated with various management operations, such as prompting the mobile drive units 102 to move to a calibration region for calibration of the sensors 218, to recharge the power storage device 216 and/or have power storage device 216 replaced, to instruct inactive mobile drive units 102 to park in a location outside the anticipated traffic flow or a location near the anticipated site of future tasks, and/or to direct the mobile drive units 102 selected for repair or maintenance to move towards a designated maintenance station.

The route planning module 204 receives route requests from mobile drive units 102. These route requests identify one or more destinations associated with a task the requesting mobile drive unit 102 is executing. In response to receiving a route request, the route planning module 204 can generate a path to one or more destinations identified in the route request. The route planning module 204 may implement any appropriate algorithms utilizing any appropriate parameters, factors, and/or considerations to determine the appropriate path. After generating an appropriate path, the route planning module 204 can transmit a route response identifying the generated path to the requesting mobile drive unit 102 using, using for example, the communication interface module 210.

The segment reservation module 206 can receive reservation requests from mobile drive units 102 attempting to move along paths generated by the route planning module 204. These reservation requests request the use of a particular portion of workspace 112 (referred to herein as a "segment") to allow the requesting mobile drive unit 102 to avoid collisions with other mobile drive units 102 while moving across the reserved segment. In response to received reservation requests, the segment reservation module 206 can transmit a reservation response granting or denying the reservation request to the requesting mobile drive unit 102 using the communication interface module 210.

The inventory module 208 can maintain information about the location and number of items in the inventory system 100. Information can be maintained about the number of items in a particular inventory holder 104 and/or inventory holder 104 and the maintained information can include the location of those items in the inventory holder 104 and/or inventory holder 104. The inventory module 208 can also communicate with the mobile drive units 102, utilizing task assignments 116 to maintain, replenish or move items within the inventory system 100.

The communication interface module 210 can facilitate communication between management module 110 and other components of inventory system 100, including reservation responses, reservation requests, route requests, route responses, and task assignments. These reservation responses, reservation requests, route requests, route responses, and task assignments may represent communication of any form appropriate based on the capabilities of management module 110 and may include any suitable information. Depending on the configuration of management module 110, the communication interface module 210 can be responsible for facilitating either or both of wired and wireless communication between the management module 110 and the various components of inventory system 100. In particular embodiments, the management module 110 can communicate using communication protocols such as 802.11, Bluetooth, or Infrared Data Association (IrDA) standards. Furthermore, the management module 110 can, in particular embodiments, represent a portion of mobile drive unit 102 or other components of inventory system 100. In such embodiments, the communication interface module 210 can facilitate communication between management module 110 and other parts of the same system component.

In general, the resource scheduling module 202, the route planning module 204, the segment reservation module 206, the inventory module 208, and the communication interface module 210 can each represent any appropriate hardware and/or software suitable to provide the described functionality. In addition, as noted above, the management module 110 may, in particular embodiments, represent multiple different discrete components and any or all of the resource scheduling module 202, the route planning module 204, the segment reservation module 206, the inventory module 208, and the communication interface module 210 can represent components physically separate from the remaining elements of management module 110. Moreover, any two or more of the resource scheduling module 202, the route planning module 204, the segment reservation module 206, the inventory module 208, and the communication interface module 210 can share common components. For example, in particular embodiments, the resource scheduling module 202, the route planning module 204, the segment reservation module 206, and the inventory module 208 can represent computer processes executing on the processor 212 and the communication interface module 210 comprises a wireless transmitter, a wireless receiver, and/or a related computer process executing on the processor 212.

Figure 3:
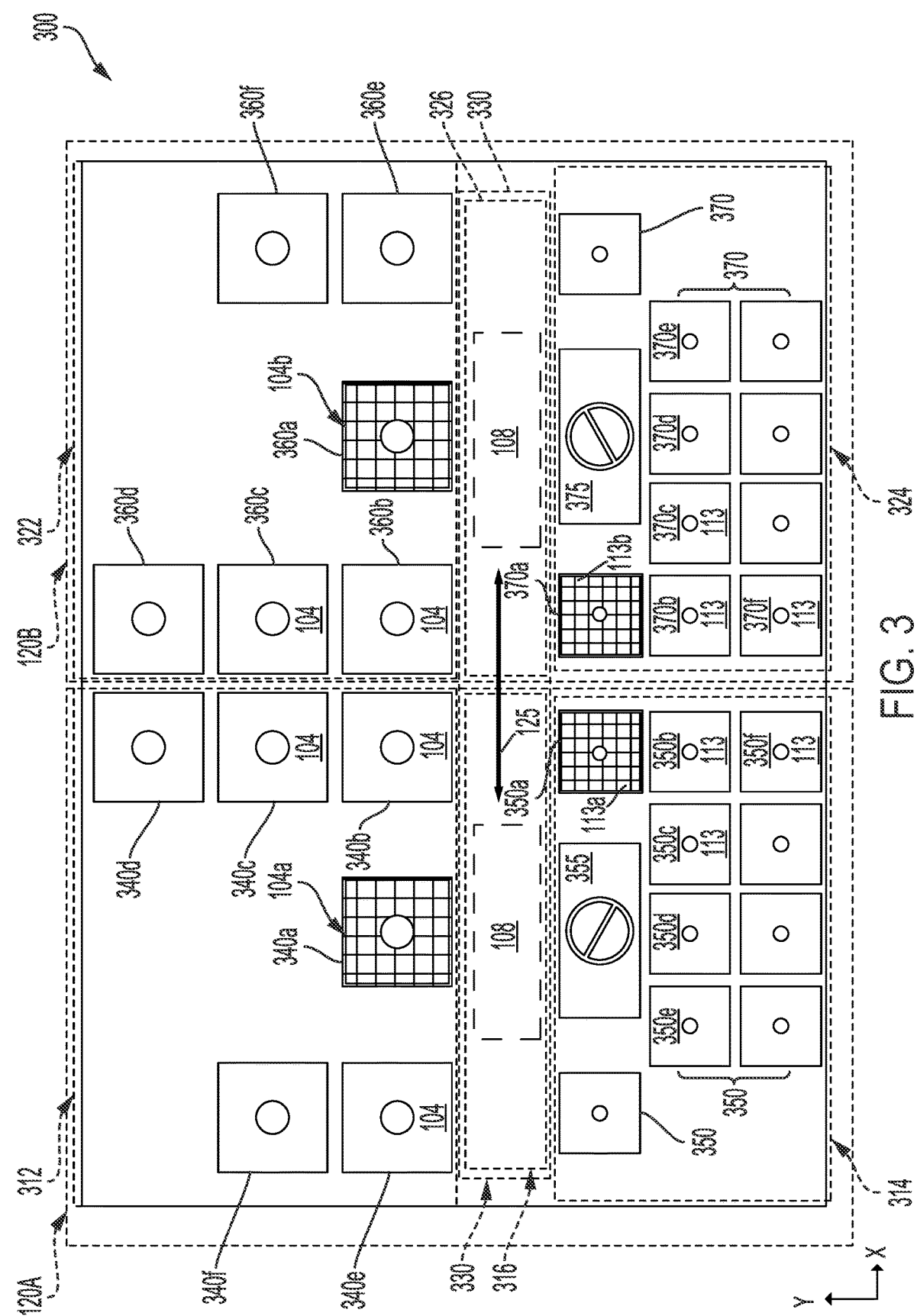
FIG. 3 is a schematic representation of an example of a pendulum queue system employed for item transfer in an inventory system in accordance with various embodiments.

Turning to FIG. 3, a top view is shown illustrating an example of a set of queues 120 (e.g., a first queue 120A and a second queue 120B) both accessible by a transfer apparatus 108. An x-direction (e.g., a lateral direction) and a y-direction (e.g., a direction perpendicular to lateral) are shown in FIG. 3 relative to the components depicted, although any other suitable reference directions may be utilized. Each queue can include a storage portion (e.g., a first storage portion 312 and a second storage portion 322) configured to receive and cycle a set of inventor holders 104, and a delivery portion (e.g., a first delivery portion 314 and a second delivery portion 324) configured to receive and cycle a set of carriers 113. Each delivery portion can be separated from the storage portion by an operating space (e.g., a first operating space 316 and a second operating space 326). The transfer apparatus 108 can be configured to move back and forth between the first queue 120A and the second queue 120B. Such configuration of the inventory system can be referred as a pendulum queue system. The back-and-forth movement can enable the transfer apparatus 108 to efficiently perform inventory processing, e.g., reducing downtime within a particular queue. For example, the transfer apparatus 108 can transfer items between an inventory holder and a carrier within a queue (e.g., the first queue 120A) while the other queue (e.g., the second queue 120B) can cycle the inventory holders 104 within its storage portion (e.g., the second storage portion 322). Thus, in a particular duration of time in which the transfer apparatus 108 is active within one queue (e.g., the first queue 120A), the other queue (e.g., the second queue 120B) can be made ready for transferring item(s) by the transfer apparatus 108, thereby reducing any downtime that may be experienced due to waiting for cycling within the queue where the transfer apparatus 108 has most recently operated. After finishing transferring the item(s) in one queue, the transfer apparatus 108 can quickly move to the other queue which is already ready for transferring items. Such coordination between transferring items in one queue while preparing the other queue for transferring another item can substantially reduce the inventory handling time. Additionally, in various embodiments, each of the queues and the transfer apparatus 108 can be configured to directly drop off the item at the carrier 113 to expedite an item transferring process between the inventory holder 104 and the carrier 113. Options for construction and working of the transfer apparatus 108 for such direct drop off are further discussed in detail with respect to FIG. 6-8.

The operating spaces 316 and 326 can be clear of any obstructions or moving components, which can allow the transfer apparatus 108 to move freely within a work envelope 330. In other words, the transfer apparatus 108 may be able to move without needing to wait for other components to clear its travel path, analyze or sense intervening objects, etc. As a result, the transfer apparatus 108 may be capable of a faster travel time compared to other types of robots or movable drive units used for transferring items. The work envelope 330 of the transfer apparatus 108 may include at least parts of each of the operating spaces 316 and 326, e.g., to enable the transfer apparatus to readily move between and/or into each of the queues 120A and 120B (e.g., as illustrated by arrow 125).

In some embodiments, each queue (e.g., the first queue 120A and the second queue 120B) can include a set of storage work cells (e.g., a first set of storage cells 340a-340f, collectively referred to as cells 340, and a second set of storage cells 360a-360f, collectively referred as cells 360) through which inventory holders 104 are cyclable. A storage cell can be a location within the storage portion and sized to receive a single inventory holder 104. For example, each of the storage cells 340 as depicted in FIG. 3 is located within the first storage portion 312 to receive a single inventory holder 104. Similarly, each of the storage cells 360 is located within the second storage portion 322 to receive a single inventory holder 104. The storage cells 340 and 360 can be arranged in a line, or an array within the respective storage portions 312 and 322 of the respective queues 120A and 120B. As discussed, each of the inventory holders 104 can be carried and moved by a mobile drive unit 102. Accordingly, the mobile drive unit 102 can be instructed to move between the storage cells in a predetermined order. As such, the cycling of the inventor holders 104 within the storage portion can be performed by moving the mobile drive unit 102 carrying an inventory holder at one storage cell (e.g., at 340c) to another storage cell (e.g., 340b) in the predetermined order.

In some embodiments, a delivery portion of a queue (e.g., the first queue 120A and the second queue 120B) can be configured to cycle through the carriers 113. In some embodiments, the carriers can be a conveyor or coupled to a conveyor to cycle through the items to be picked up or stored. In some embodiments, each delivery portion can include a set of delivery work cells (e.g., a first set of deliver work cells 350a-350f, collectively referred as cells 350, and a second set of delivery work cells 370a-370f, collectively referred as cells 370) through which carriers 113 (e.g., a mobile drive unit 102 configured to receive or deliver an item) are cyclable. A delivery cell can be a location within the delivery portion and sized to receive a single carrier 113. For example, each of the delivery work cells 350 as depicted in FIG. 3 is located within the first delivery portion 314 to receive a single carrier 113. Similarly, each of the delivery work cells 370 is located within the second delivery portion 324 to receive another single carrier 113. The delivery cells 350 and 370 can be arranged in a line, or an array within the respective delivery portions 314 and 324 of the respective queues 120A and 120B. As discussed, each of the carriers 113 (e.g., a mobile drive unit 102 configured to receive or deliver an item) can be moved relative to each other in a predetermined order. Accordingly, the cycling of the carriers 113 within the delivery portion can be performed.

In some embodiments, each of the first storage portion 312 and the second storage portion 322 includes an assigned location also referred to as an assigned holder location or an assigned storage work cell (e.g., a first assigned storage work cell 340a and a second assigned storage work cell 360a) at which a particular inventory holder (e.g., a first inventory holder 104a and a second inventory holder 104b) can be positioned during transferring the item. Similarly, each of the first delivery portion 314 and the second delivery portion 324 can include another assigned location also referred to as an assigned carrier location or an assigned delivery work cell (e.g., a first assigned delivery work cell 350a and a second assigned delivery work cell 370a) at which a carrier is positioned during transferring the item. These assigned locations or cells 340a and 350a (and similarly the assigned locations 360a and 370a) can be located adjacent to the operating space 316 (or 326) within which the transfer apparatus 108 can move to transfer items.

As such, the transfer apparatus 108 can easily access an item at the assigned locations without any obstructions. The assigned locations may also ensure instant availability of the particular inventory holder 104a (or 104b) and the carrier 113a (or 113b) to the transfer apparatus 108 during an item transfer process.

In some embodiments, the first assigned storage work cell 340a can be laterally offset (e.g., in the x-direction) from the first assigned delivery work cell 350a, and the second assigned storage work cell 360a can be laterally offset (e.g., in the x-direction) from the second assigned delivery work cell 370a. These lateral offsets may facilitate synching time tolerance between the particular inventory holder 104a (or 104b) and the particular carrier 113a (or 113b) without affecting a total item transfer time of the transfer apparatus 108.

During the time interval of transferring the items, both the particular inventory holder 104a (or 104b) and the particular carrier 113a (or 113b) may be instantly available to the transfer apparatus 108. In some embodiments, the particular inventory holder 104a (or 104b) and the particular carrier 113a (or 113b) can arrive at the same time or one after the other through the cycling process. In either case, the particular inventory holder 104a (or 104b) and the carrier 113a (or 113b) may be instantly available to the transfer apparatus 108 to avoid delays in inventory processing. For example, the particular inventory holder 104a can arrive first at the assigned location 340a so that the transfer apparatus 108 can start extracting an item from the inventory holder 104a, and the particular carrier 113a can be moved to arrive into the assigned location 350a slightly later such that when the transfer apparatus 108 carrying the extract item arrives at the assigned location 350a, the particular carrier 113a is available to receive the extracted item.

In some embodiments, each of the first delivery portion 314 and the second delivery portion 316 may include a clearance cell (e.g., a first clearance cell 355 and a second clearance cell 375). The clearance cell can be a portion free of any inventory system components that may potentially obstruct or interfere with the transfer apparatus 108. The clearance cell (e.g., the cell 355 and the cell 375) can be located opposite to the respective assigned storage work cell (e.g., the assigned cells 340a and 360a) to facilitate translation of the transfer apparatus while carrying the item without collision with a carrier. For example, a portion of the transfer apparatus 108 may extend into the delivery portion. As such, during extracting and/or delivering of items, the clearance cell can provide an unobstructed working space to the transfer apparatus 108. Additionally or alternatively, the clearance cell 355 in cooperation with the lateral offset (e.g., between the assigned storage work cell 340a and the assigned delivery work cell 350a) may facilitate free movement of the header 630 so that there is no height conflict with a carrier if the header 630 is moving up and down along the inventory holder.

Figure 4:
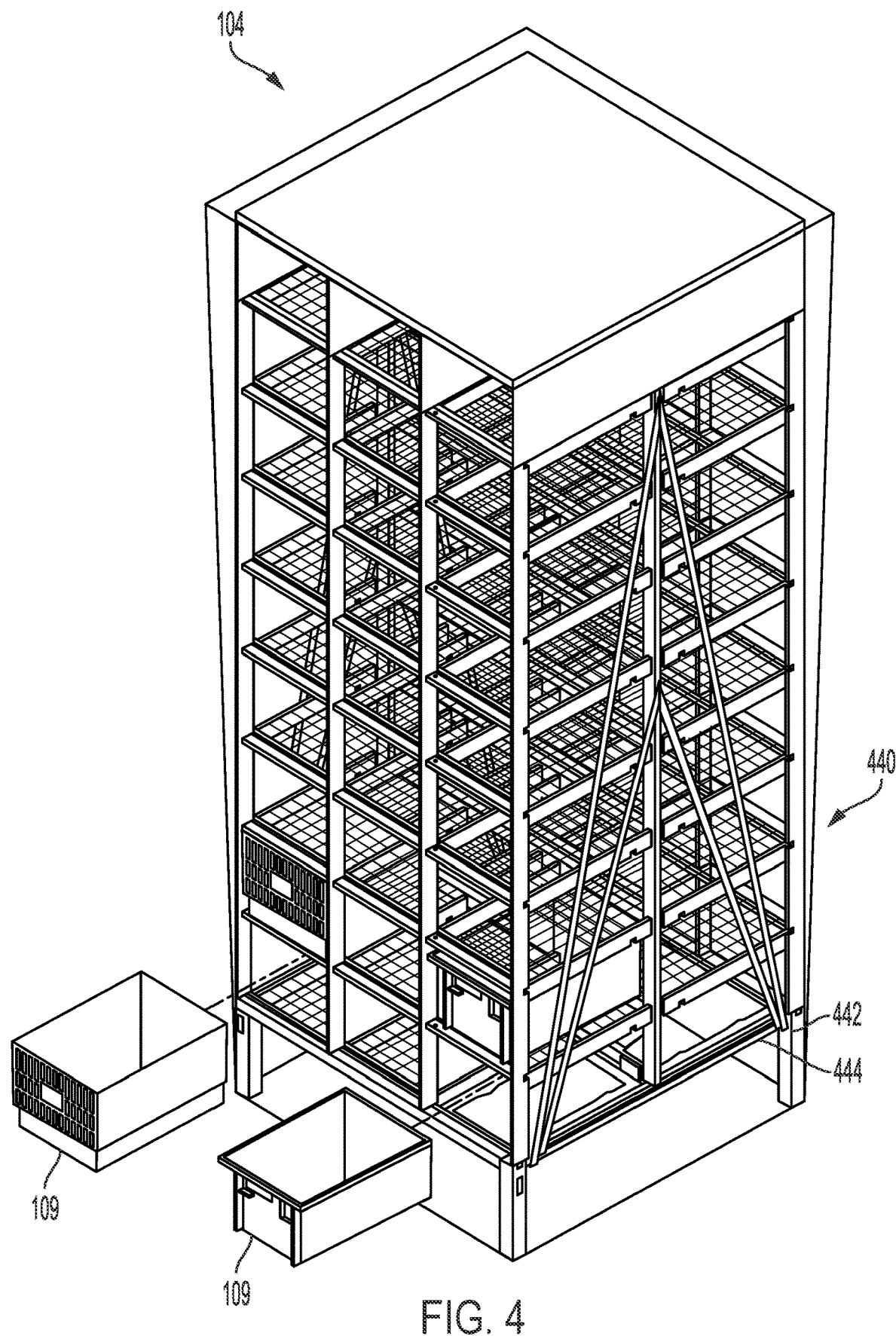
FIG. 4 is a perspective view illustrating examples of components relative to an example of an inventory holder in accordance with various embodiments.

Turning to FIG. 4, a perspective view is shown illustrating examples of components relative to an example of an inventory holder 104 in accordance with various embodiments.

The inventory holder 104 may correspond to a shelving unit and/or otherwise include a suitable frame 440 for supporting containers 109 and/or other inventory items. The frame 440 can include legs 442 and storage shelves 444. The legs 442 may support the storage shelves 444. For example, the storage shelves 444 may be supported so that the storage shelves 444 are vertically distributed along the inventory holder 104.

In various embodiments, the legs 442 may be sized to form device openings suitably sized to permit a mobile drive unit 102 to drive between the legs 442. The mobile drive unit 102 may utilize the coupling head 530 (e.g., FIG. 5) to engage a coupling surface (e.g., a load-bearing surface) of the frame 440 for lifting the inventory holder 104. For example, the load-bearing surface of the frame 440 may be positioned along an underside of a lowermost storage shelf 444 of the inventory holder 104.

Each storage shelf 444 may be suitably sized and/or otherwise configured to receive and support a plurality of items. For example, in FIG. 4, each storage shelf 444 is shown having suitable bays for receiving three containers 109 (e.g., which may have form factors of totes), although non-containerized items may be utilized additionally or alternatively. Like or similar types of containers 109 and/or items may be stored in the inventory holder. For example, although to different types of containers 109 are shown by way of example in FIG. 4, any number of types of containers 109 and/or items may be included in the inventory holder 104. Any suitable number of rows and/or columns may be utilized. The storage shelf 444 may be sized for containing multiple containers 109 end to end along a depth of the storage shelf 444. In some embodiments, corresponding components for interreacting with the inventory holder 104 may include suitable structure for reaching in to pull containers 109 or other items from positions arranged multiple deep along the depth direction from a front face of the inventory holder 104. Additionally or alternatively, the inventory holder 104 may be rotatable or otherwise movable (e.g., by a mobile drive unit 102) to provide access to containers 109 or items on a different side other than the front face of the inventory holder 104. In some embodiments, the storage shelves 444 may be arranged to allow containers 109 or other items to be inserted through one face and removed through another (e.g., in a pass-through arrangement).

Figure 5:
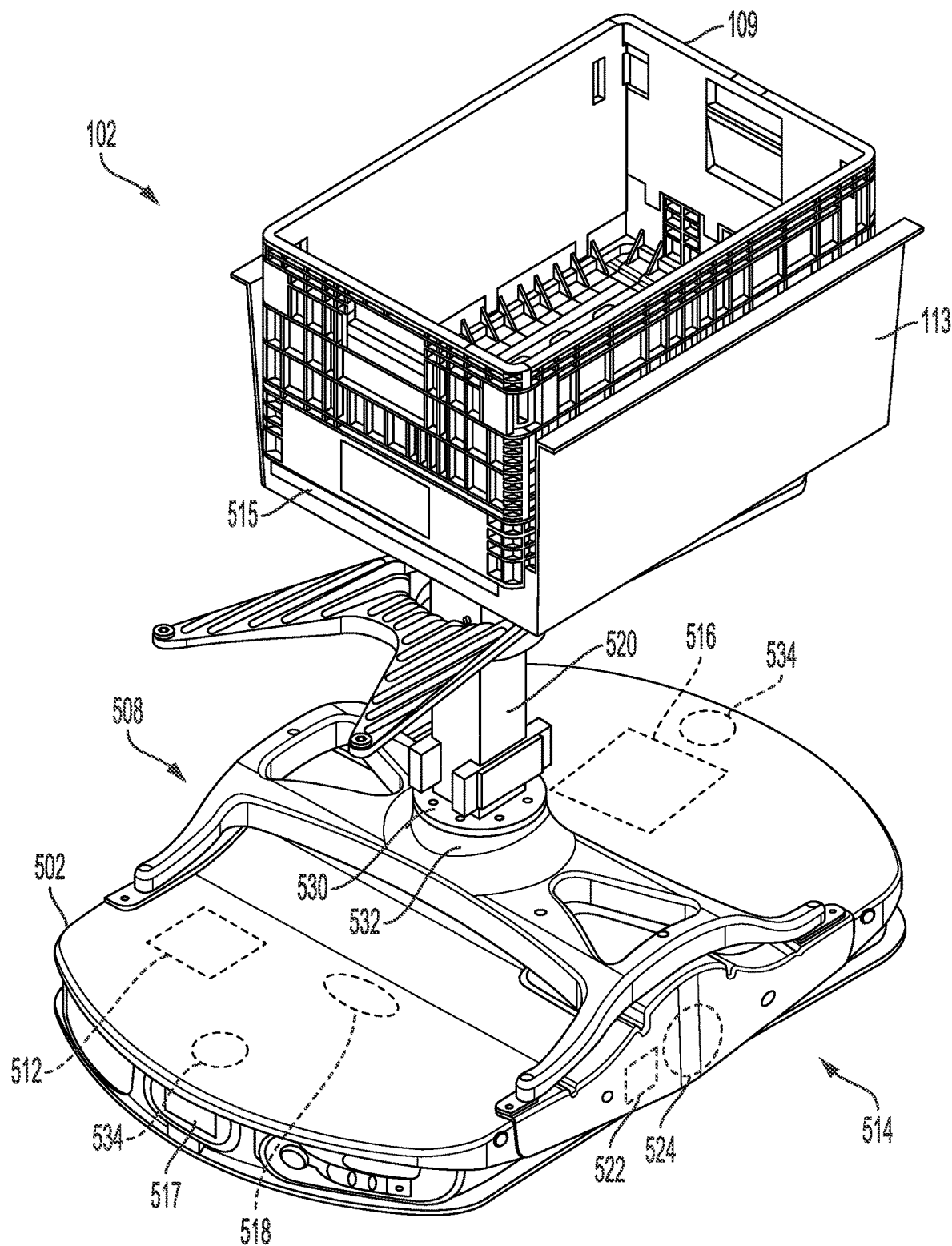
FIG. 5 is a perspective view illustrating examples of components relative to an example of a mobile drive unit in accordance with various embodiments.

Turning to FIG. 5, a perspective view is shown illustrating examples of components relative to an example of a mobile drive unit 102 in accordance with various embodiments.

The mobile drive unit 102 can include a body 502 dimensioned to house various components and/or systems of the mobile drive unit 102. For example, the body 502 can include suitable panels or other structural members of any suitable materials to form a protective enclosure for the components and/or systems. The body 502 can house and/or support features such as a coupling system 508, a controller 512, a drive system 514, a power storage device 516 (e.g., a battery), one or more indicator lights 517, and/or one or more sensors 518. However, the body 502 can include, house, and/or support any suitable mobile drive unit components.

The power storage device 516 can provide power to the coupling system 508, the controller 512, the drive system 514, the indicator lights 517, and/or the sensor(s) 518. For example, the power storage device 516 can include one or more battery modules that can provide power to the components of the mobile drive unit 102. In various embodiments, the power storage device 516 can include rechargeable battery packs. For example, mobile drive units 102 can engage with a docking system to recharge the battery packs. Additionally or alternatively the power storage device 516 can be removed and replaced with a fully charged power storage device 516.

The coupling system 508 can engage with the inventory holder 104 or other components. For example, the coupling system 508 may engage with the inventory holder 104 to allow the mobile drive unit 102 to move the inventory holder 104 (e.g., around the workspace 112). The coupling system 508 can additionally or alternatively allow the drive unit 120 to lift the inventory holder 104, propel the inventory holder 104, rotate inventory holder 104, and/or move the inventory holder 104 in any other appropriate manner. The coupling system 508 may include suitable connectors 520 or other structure to facilitate establishing communication of power, instructions, data, physical support, etc. between the mobile drive unit 102 and the inventory holder 104 or other structures. Non-limiting examples may include electrical contacts, pneumatic hose junctures, near field communication components, or other structures for establishing conduits of mediums for communication.

In some embodiments, the coupling system 508 may include a coupling head 530 that may include any appropriate combination of components, such as ribs, spikes, and/or corrugations, to couple with, support, and/or facilitate manipulation of inventory holder 104 (such as lifting, propelling, rotating, moving, and/or actuating). For example, the coupling head 530 may include a high-friction portion that abuts a portion of the inventory holder 104 and provides frictional forces that may induce translational and rotational movement in the inventory holder 104 when the coupling head 530 moves and rotates, respectively. As a result, mobile drive unit 102 may be able to manipulate inventory holder 104 by moving or rotating the coupling head 530, either independently or as a part of the movement of mobile drive unit 102 as a whole.

The coupling system 508 may include a coupling actuator 532 that moves the coupling head 530 toward the inventory holder 104 to facilitate coupling of the mobile drive unit 102 and the inventory holder 104. The coupling actuator 532 may also be capable of adjusting the position or orientation of coupling head 530 in other suitable manners to facilitate coupling. The coupling actuator 532 may include any appropriate components, based on the configuration of mobile drive unit 102 and inventory holder 104, for moving the coupling head 530 or otherwise adjusting the position or orientation of coupling head 530. As non-limiting examples, the coupling actuator 532 may include a motorized shaft or screw drive attached to the coupling head 530 and operable to lift the coupling head 530 as appropriate for coupling with inventory holder 104.

The controller 512 can include one or more computer processors (also referred to as processors) and a memory. The one or more computer processors may be implemented in any suitable form, such as a general purpose microprocessor, an application-specific integrated circuit (ASIC), and so forth. The memory may include a variety of computer-readable media selected for their size, relative performance, or other capabilities: volatile and/or non-volatile media, removable and/or non-removable media, etc. The controller 512 can be configured to implement one or more techniques described herein for operating the inventory holder 104, for example.

The one or more sensors 518 can be or include sensors that can aid in navigation around the environment (e.g., around the workspace 112). The sensors 518 can be or include inertial sensors, navigational sensors, and so forth. In various embodiments, for example embodiments where the mobile drive unit 102 is operating in an unstructured field, the mobile drive unit 102 can be equipped with sensors 518 that can be used for navigation through the unstructured field. The sensors 518 can be part of an obstacle detection system that can detect obstacles (e.g., objects, individuals, and/or items in the workspace 112), physical barriers, fiducials 114, and/or other mobile drive units 102 within the environment (e.g., workspace 112). The sensors 518 can additionally or alternatively be or include visual sensors (e.g., cameras), ranging sensors (e.g., radar, lidar), proximity sensors, an impact sensor, a color sensor, a magnetic sensor, an electrical sensor, a cliff sensor, a brightness sensor, a spectrometer, a photometer, and/or any suitable sensors 518 for detecting obstacles and/or objects in the workspace 112.

In various embodiments, the sensor 518 can be or include a downward-facing camera configured to detect fiducials 114 (or fiducial markers) on the floor of the environment (e.g., workspace 112), e.g., to facilitate navigation of the mobile drive unit 102. In various embodiments, the sensor 518 can be or include an upward-facing camera configured to detect fiducials 114 (or fiducial markers) on underside of an inventory holder 104 (e.g., to facilitate appropriate operation of the coupling system 508 for coupling with the inventory holder 104).

The controller 512 can receive sensor signals from the sensors 518 and perform processing on the sensor signals. For example, the computer processor(s) of the controller 512 can perform image processing on the sensor signals (e.g., images) received from the sensors 518 to detect obstacles, physical barriers, etc.

In further embodiments, the computer processor(s) of the controller 512 can perform navigation control based on the sensor signals (e.g., images) received from the sensors 518. As noted above, the workspace 112 associated with the inventory system 100 can include a number of fiducials 114 distributed to cover all or a portion of the workspace 112. In such embodiments, the sensors 518 can detect the fiducials within the field-of-view of the sensors 518 (e.g., on the floor of the workspace 112). The controller 512 can determine location information that includes a position and orientation of the mobile drive unit 102, via processing an image captured by the sensors 518 encompassing one or more of the fiducials 114. As a result, the controller 512 can maintain an accurate indication of the location and orientation of the mobile drive unit 102 to aid in navigation when moving the mobile drive unit 102 within the workspace 112. In some embodiments, the controller 512 can transmit the sensor signals from the sensors 518 to another computing system (e.g., management module 110), for example, to determine location information of the mobile drive unit 102. In this embodiment, the other computing system may transmit navigational commands to the mobile drive unit 102, based on the location information.

The controller 512 can generate one or more control signals for the drive system 514 to actuate the mobile drive unit 102 over the floor of the environment. The one or more control signals for the drive system 514 can be based on at least one of the sensor signals from the sensors 518. In some embodiments, the controller 512 can further receive sensor signals from a navigational sensor (which may be implemented in the mobile drive unit 102 or in an external computing device) and the one or more control signals for the drive system 514 can be further based on the sensor signals from the navigational sensor.

The drive system 514 can include a powertrain (e.g., electric motor(s) 522 and drivetrain components) (not shown) and wheels 524. In some embodiments, the mobile drive unit 102 can use differential steering to turn the mobile drive unit 102 without separately steering the wheels 524. For example, the mobile drive unit 102 may be able to perform neutral turns by rotating, within a pair of axially-aligned wheels, one wheel in a forward direction and the other wheel in a reverse direction. Further, in some embodiments, the mobile drive unit 102 may include one or more stabilizer wheels 534 that are not driven by the drive system 514.

In some embodiments, the mobile drive unit 102 can include one or more indicator lights 517 (e.g., located at any suitable location or combination of locations along the body 502). The controller 512 can selectively illuminate the indicator lights 517 of the mobile drive unit 102. The indicator lights 517 can convey any suitable information to human operators collocated within the environment. For example, the controller 512 can operate the indicator lights 517 to indicate that the mobile drive unit 102 is moving, a direction that the mobile drive unit 102 is moving, how fast the mobile drive unit 102 is moving, whether the mobile drive unit 102 is engaged with an inventory holder 104, whether the mobile drive unit 102 detects an obstacle, a physical barrier, and/or a fiducial 114, and so forth. The controller 512 can additionally or alternatively illuminate the indicator lights 517 in any manner suitable to convey the different information. For example, the controller 512 can control the colors displayed by the indicator lights 517, illumination patterns, and so forth.

In some embodiments, the mobile drive unit 102 can include and/or be coupled with a carrier 113. For example, the mobile drive unit 102 is depicted as coupled with a carrier 113, although the mobile drive unit 102 may be separated from the carrier 113 (e.g., in an alternate mode of operation) to facilitate engagement with an inventory holder 104 and/or other component of the inventory system 100.

The carrier 113 can include suitable structure for carrying one or more containers 109 and/or one or more other inventory items. In FIG. 5, the carrier 113 is represented as a cradle having a floor and walls, although any other structure may be utilized. In FIG. 5, the carrier 113 is also shown supported from the mobile drive unit 102 by a coupler 520 that includes a post, although any other form factor or structure may be utilized for engagement and/or support relative to the mobile drive unit 102. The carrier 113 may be permanently coupled or releasably coupled with the mobile drive unit 102. In some examples, the carrier 113 may correspond to a part of a conveyor system that may include rollers, belts, and/or other conveyor structure may be capable of transporting containers 109 and/or other items to and/or from a particular location independent of a mobile drive unit 102.

In some embodiments, the carrier 113 may be capable of facilitating transfer of a container 109 and/or other inventory item relative to the carrier 113. As one example, the carrier 113 is depicted in FIG. 5 as including a transporter 515 that may include a belt that may be driven to assist with moving a container 109 and/or other inventory item onto and/or off of the carrier 113. However, rollers, rams, pushers, pullers, actuators, or any other form of transporter 515 may be utilized.

Figure 6:
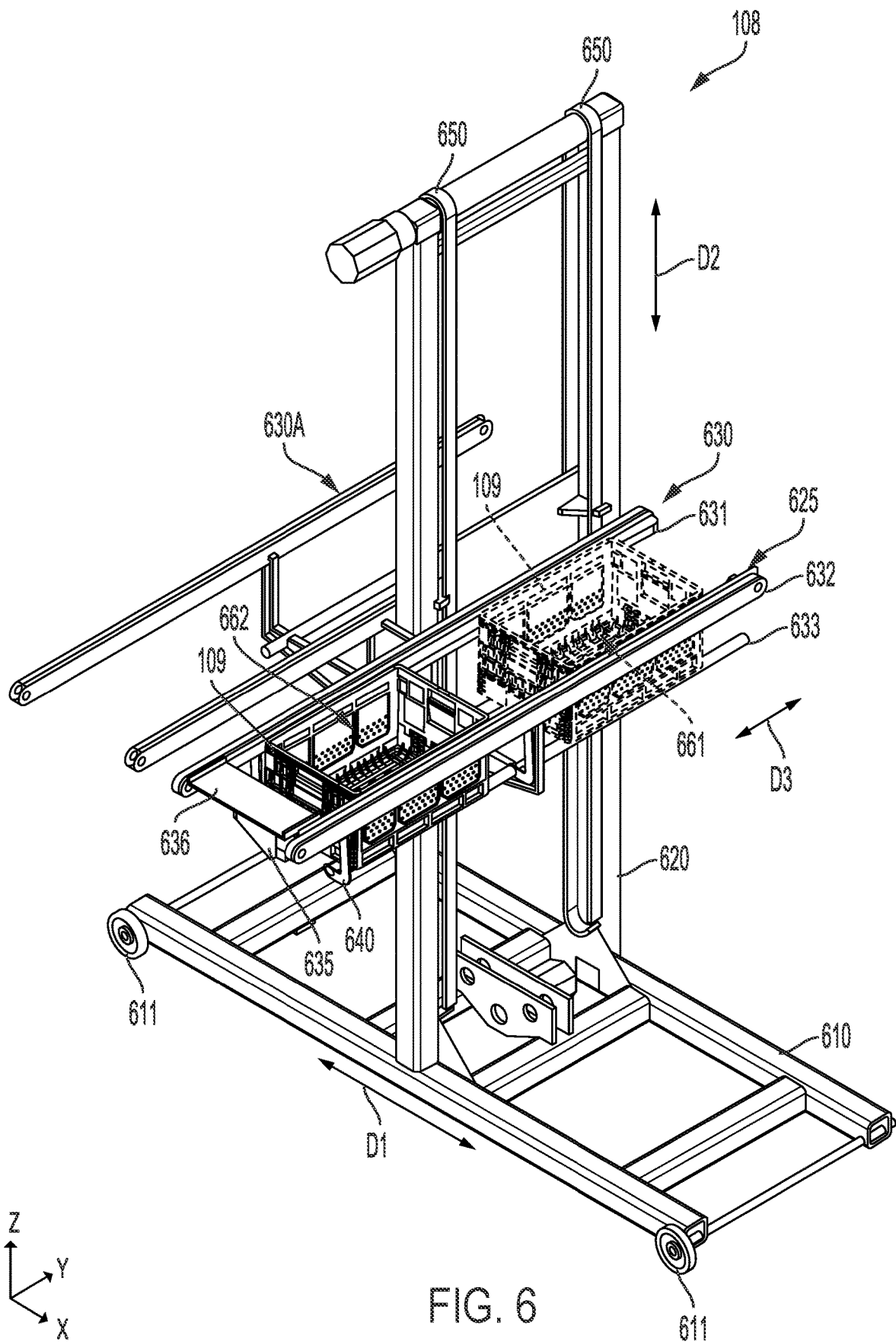
FIG. 6 is a perspective view of an example of a transfer apparatus in accordance with various embodiments

FIGS. 6-8 illustrate an example construction of a transfer apparatus 108 configured to transfer items within an inventory system (e.g., in FIG. 1 and FIG. 3). For example, as discussed herein, the transfer apparatus 108 can be configured to move and extract an item from an inventory holder 104, carry the item to a carrier 113, and directly drop off the item on the carrier 113. The transfer apparatus 108 can be further configured to pick up an item from a carrier 113, carry the item to the inventory holder 104, and push the item into the inventory holder 104. The transfer apparatus 108 may achieve item transferring steps by moving in a lateral direction D1, a vertical direction D2, and a depth direction D3 perpendicular to the lateral direction and the vertical direction. For example, relative to the x-, y-, and z-directions shown in FIG. 6, the lateral direction D1 may correspond to the x-direction, the vertical direction D2 may correspond to the z-direction, and the depth direction D3 may correspond to the y-direction. In some embodiments, an item may be placed in a container. In some embodiments, the container may hold a plurality of items. Additionally or alternatively, the item may be directly placed within a compartment of the inventory holder. 104. For the purposes discussion herein, items may be shown as a container for easy of visualization without limiting the scope of the present disclosure.

The transfer apparatus 108 can include a laterally movable frame 610 moveable in the lateral direction, an upright frame 620 supported by the laterally movable frame 610, and a header 630 movably coupled to the upright frame 620 and configured to move in the vertical direction. The laterally movable frame 610 may be coupled to a rail and a pulley assembly or any other suitable structure capable of facilitating movement of the laterally movable frame 610 laterally. For example, when implemented in the pendulum queue system of FIG. 3, the rail may be laid within the work envelope 330 and/or may be included at least in part in each of the first operating space 316 and the second operating space 326. The upright frame 620 may support a hoist 650 (e.g., a pulley mechanism, a rack and pinion assembly, a ball screw assembly, or other suitable driving mechanisms actuatable for imparting vertical motion). The hoist 650 may be coupled to the header 630. The hoist 650 can drive the header 630 in the vertical direction. In some embodiments, to facilitate quick transfer of items, the laterally movable frame 610 and the header 630 may be moved simultaneously. For example, after the item 109 is extracted from the inventory holder (e.g., 104a), the laterally movable frame 610 can be moved laterally (e.g., on wheels 611) while the header 630 can be translated in the vertical direction by the hoist 650.

The header 630 can include an item carriage 625 extending along a depth direction perpendicular to the lateral direction and the vertical direction, an extractor 635 actuatable along the depth direction and configured to engage with an item, and a claw assembly 640 configured to open or close. The header 630 can be configured to directly drop off of an item by vertically moving the item carriage 625 to align its bottom open portion with a carrier 113 and activating the claw assembly 640 to release an item from the bottom open portion.

The item carriage 625 can include a first section 661 configured for item transfer in the depth direction. The item carriage 625 may further include a second section 662 configured for item transfer in the vertical direction. In some embodiments, the second section 662 includes a bottom opening 663 (see FIGS. 7A and 8A), which may facilitate quick drop-off of an item 109 from the item carriage 625 on to a carrier 113. Also, the bottom open portion may facilitate a quick pick of an item from the carrier 113. In some embodiments, the item carriage 625 can includes side rails 631 and 632 extending along the depth axis and spaced apart to receive the item therebetween. The side rails 631 and 632 may extend along the first section 661 and the second section 662. The side rails 631 and 632 can guide the item 109 within the item carriage 625 along the depth direction while being extracted from an inventory holder (e.g., 104a). The side rails 631 and 632 can also be used to align with sides of a compartment of the inventory holder 104. The item carriage 625 can further include a bottom rail 633 disposed in the first section 661 and configured to support the item 109. For example, the item 109 when located in the first section 661 (e.g., as illustrated by phantom lines) can be supported at the bottom of the item 109 to be securely held in the item carriage 625, e.g., when the transfer apparatus 108 is moving in the lateral direction and/or the vertical direction.

In some embodiments, the first section 661 of the item carriage 625 can be supported by the upright frame 620, and the second section 662 of the item carriage 625 may extend beyond the upright frame 625 in the depth direction. As such, when the transfer apparatus 108 moves within the operating spaces (e.g., 316 and 326), the second section 662 can extend and align the item 109 over the carriage (e.g., 113a) to facilitate a direct drop off or pick up relative to the carriage 113.

In some embodiments, the extractor 635 can be coupled to the item carriage 625 and configured to pull an item from an inventory holder into the item carriage 635. The extractor 635 can be configured to pull the item 109 into the first section 661 (e.g., into the position shown in phantom lines) and further into the second section 662 over the claw assembly 640 in a closed state (e.g., into the position shown in solid lines). The extractor 635 can also be configured to push the item 109 into an empty compartment of the inventory holder (e.g., 104a). For example, an item 109 picked up in the second section 662 can be pushed by the extractor 635 (e.g., along the depth direction) into the inventory holder (e.g., 104a).

In some embodiments, the extractor 635 can be coupled to an extractor carriage 636, which can be slidably coupled with the item carriage 625 to move the extractor 635 in the depth direction. The extractor carriage 636 can extend between the side rails 631 and 632, and the extractor 635 can be located at a top or around a center of the second section 662. In some embodiments, the side rails 631 and 632 can be configured to include sliding rails or slots 637 (e.g., FIG. 7A) extending in the depth direction to guide the extractor carriage 636. By actuating the extractor carriage 636, the extractor 635 can be moved in the depth direction. In some embodiments, the extractor 635 can be or include a suction cup, a gripper, a hook, or other mechanism configured to engage with the item 109 in the inventory holder (e.g., 104a).

In some embodiments, the claw assembly 640 can be disposed along the second section 662. Portions of the claw assembly 640 can extend along the bottom open portion 663 of the header 630. Such positioning may advantageously facilitate a direct drop off in a vertical direction onto a carrier 113. The claw assembly 640 can be controlled to adjust an amount of opening of the open portion 663 of the second section 662. For example, the claw assembly 640 can be pivotably attached to the item carriage 625 to open or close to adjust a size of the opening of the bottom open portion 663.

Figure 7A:
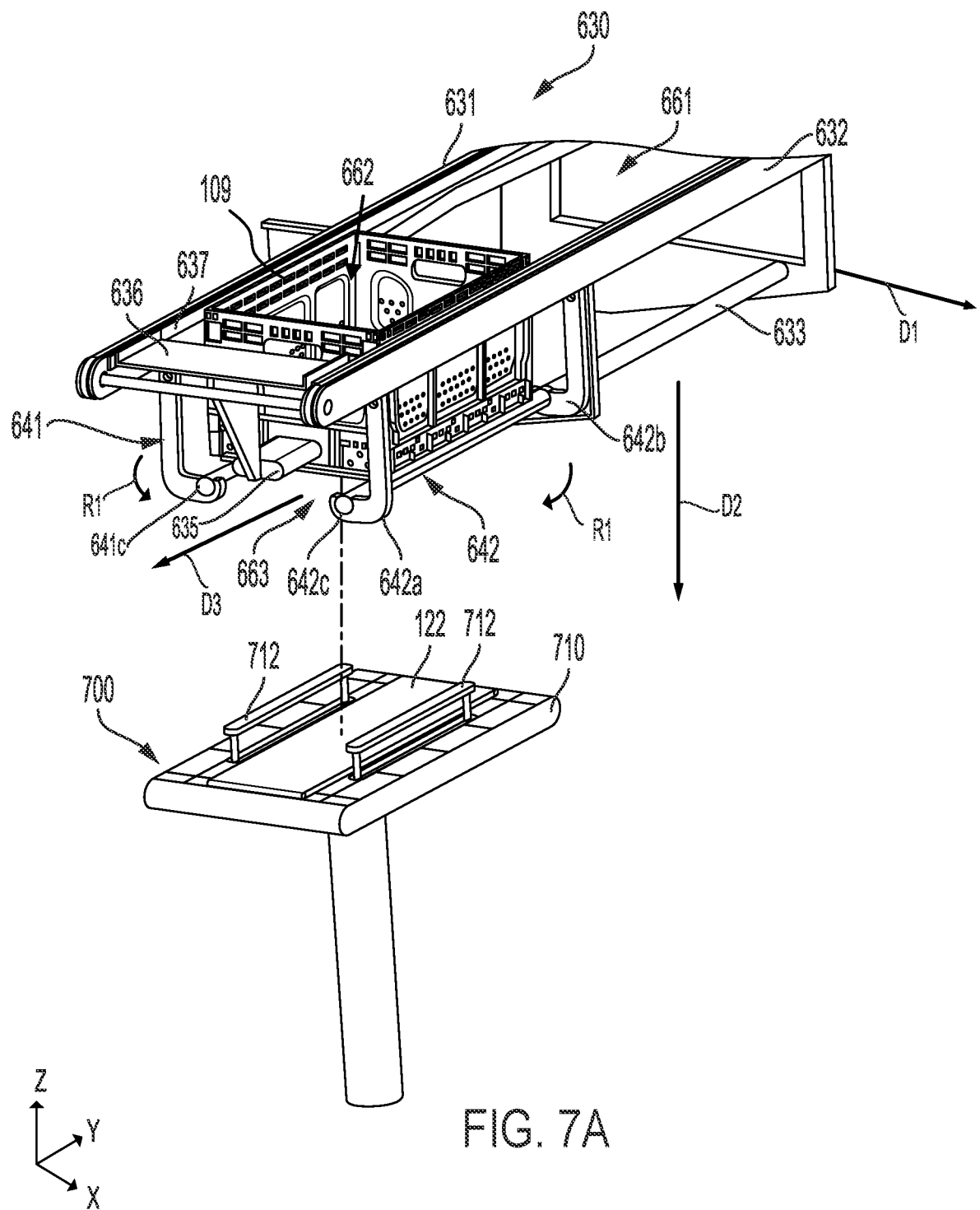
FIG. 7A illustrates an example of a header of the transfer apparatus of FIG. 6 in a closed state in accordance with various embodiments.

As may be best seen in FIG. 7A, in some embodiments, the claw assembly 640 includes a first claw element 641 with a top end pivotably attached to one side rail 631 of the item carriage 625, and a second claw element 642 with a top end pivotable about the other side rail 632 of the item carriage 625. The first claw element 641 and the second claw element 641 can be disposed along the second section 662 of the item carriage 625. In some embodiments, each of the claw elements can include angular links or bars connected by a straight bar at a bottom to support an item at the bottom. For example, as shown in FIGS. 7A and 8A, the second claw element 642 (and similarly the first claw element 641) can include right angular links 642a and 642b spaced apart along the second section 662 and connected to each other at the bottom end by a straight bar 642c. The top ends of the links 642a and 642b can be pivotably coupled to the side rail 632. It can be understood that the depicted claw assembly 640 is merely one example, and other design variations are possible without limiting the scope of the present disclosure.

FIG. 7A illustrates a closed state of the claw assembly 640, and FIG. 8A illustrates an open state of the claw assembly 640. The claw assembly 640 can close around the item 109 (e.g., as illustrated by arrow R1) and support the item 109 at the bottom to facilitate movement of the transfer apparatus holding the item 109 and to facilitate a direct drop off on a carrier 113 or a platform 700. For example, in the closed state of the claw assembly 640, the item 109 can be pulled by the extractor 635 over the claw assembly 640 (e.g., as illustrated by arrow D3). The transfer apparatus 108 holding the item 109 in the claw assembly 640 can be moved laterally to an assigned delivery location (e.g., as illustrated by arrow D1) and the header 630 can be lowered over the carrier 113 or the platform 700 (as illustrated by arrow D2). Then, the claw assembly 640 can be opened (as shown in FIG. 8A) to facilitate direct drop off over the platform 700. Alternatively or in addition, the closing action of the claw assembly 640 can be used to pick up an item from the carrier 113 or the platform 700.

In some embodiments, the platform 700 may include a landing surface 710 with retractable elements 712 retractable with respect to the landing surface 710. The landing surface 710 may further include a conveyor 122 to transfer the item to/from the carrier 113. The retractable elements 712 can support the item 109 and provide room for the claw assembly 640 to fit between an underside of the item 109 and an upper face of the landing surface 710. For example, the claw assembly 640 may open and move away from the underside of the item 109 (e.g., to a position shown in FIG. 8A), which may leave the item 109 supported on the retractable elements 712. The claw assembly 640 may travel upward along sides of the item 109 and to facilitate travel to reach another item for transfer. The retractable elements 712 may retract to bring the item 109 into contact with the landing surface 710 or otherwise into a position in which the conveyor 122 may move the item from the landing surface 710 (e.g., onto a carrier 113). In another mode of operation, the retractable elements 712 can facilitate raising of an item (e.g., a second item 109) placed on the landing platform 710. Hence, when the second item 109 is placed on the landing surface 710, the retractable elements 712 can be actuated to raise the second item 109. Then, the claw assembly 640 can be positioned above the platform 700 in an open state (e.g., which may include an open state reached by movement of the claw assembly 640 illustrated by arrow R2 in FIG. 8) and lowered so that the claw assembly 640 is around the second item 109. The bottom of the claw assembly 640 can then close to grab the second item 109 at the bottom end. Once the claw assembly 640 is closed, the retractable elements 712 can be retracted to disengage from the picked up item 109 so that the header 630 can be moved to transfer the picked up item 109 into an inventory holder 104. In some embodiments, the platform 700 may be positioned adjacent to a carrier 113 to transfer the item 109 from the platform 700 to the carrier 113 or vice versa. The platform 700 can serve as a temporary storage location for an item to be delivered or an item to be picked up. Thus, the platform 700 may advantageously provide tolerance for minor cycling time delays within a queue (e.g., the first queue 120A and the second queue 120B).

Referring back to FIG. 6, the transfer apparatus 108 can include a two-header configuration. For example, a second header 630A can be structurally the same as the header 630 described herein. The second header 630A can be movably coupled to the upright frame 625 and positioned on a side opposite of the header 630. The second header 630A and the header 630 can be aligned along bottom sides thereof. The second header 630A and the header 630 can be configured to move simultaneously along the vertical direction on the upright frame to improve the item transfer time. For example, with the two header configuration, items can be picked and delivered in a coordinated sequence as discussed in FIGS. 11-20 or the items can be picked and delivered simultaneously, as illustrated in FIGS. 21-24 depending on a configuration of the queues 120A and 120B.

It can be understood that the present disclosure is not limited to a particular mechanism employed by a claw assembly. For example, the claw assembly can be configured to include a pivotable mechanism, a slidable mechanism, or other mechanisms that allows opening or closing of the claw assembly to directly drop off or pick up an item.

Figure 7B:
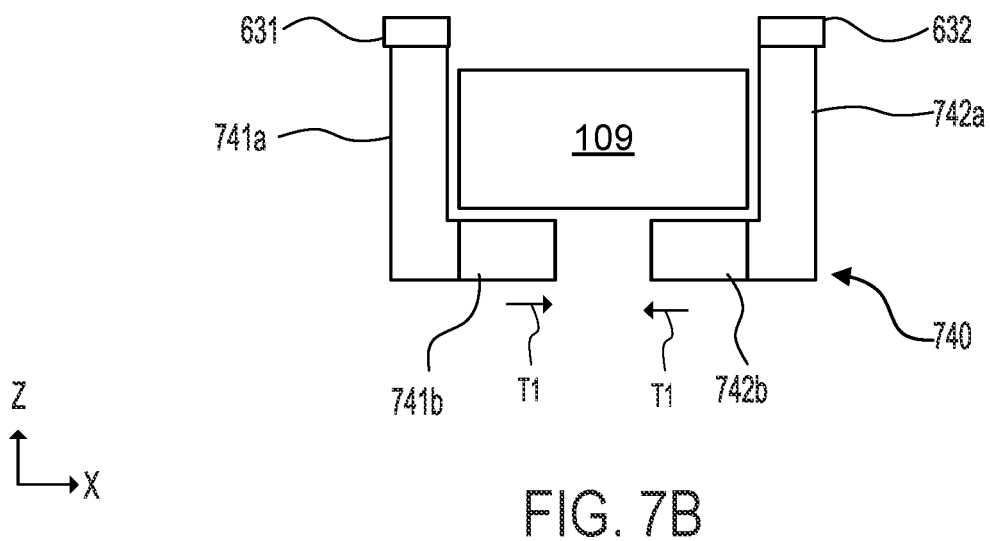
FIG. 7B illustrates another example of a claw assembly for a header of the transfer apparatus of FIG. 6 in a closed state in accordance with various embodiments.
Figure 8B:
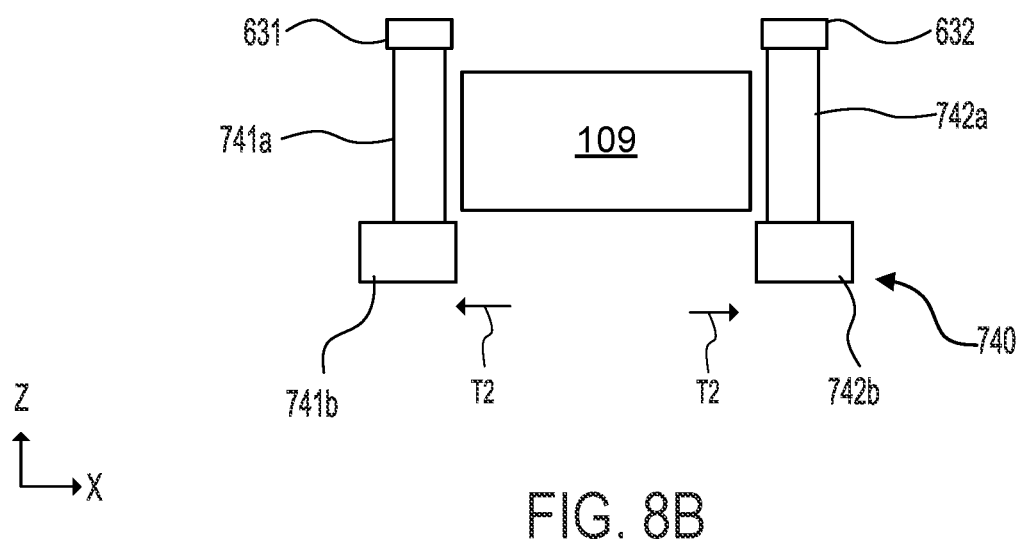
FIG. 8B illustrates the claw assembly of FIG. 7B in an open state in accordance with various embodiments.

In some embodiments, referring to FIGS. 7B and 8B, the header 630 may include a claw assembly 740 having slidable mechanism instead of pivotable mechanism of the claw assembly 640 (e.g., of FIGS. 7A and 8A). For example, the claw assembly 740 may include links 741a and 742a coupled to the side rails 631 and 632, respectively, of the header 630 (e.g., of FIG. 6), and slidable elements 741b and 742b attached at a bottom end of the links 741a and 742a respectively. The slidable elements 741a and 742a can be configured to slide in lateral directions (e.g., along x-axis) to open or close a bottom open portion of the header 630. In some embodiments, the slidable elements 741a and 742 can be configured to slide in a depth direction, e.g., sliding along a depth of the header, such as to extend beyond the section with the claw assembly 740 and/or under the other section, if present. In a closed state, e.g., such as shown in FIG. 7B, the slidable elements 741b and 742b can be actuated in a closing direction T1 to hold the item 109 in the claw assembly 740. In the open state, as shown in FIG. 8B, the slidable elements 741b and 742b can be actuated in an opening direction T2 to release the item 109 in the claw assembly 740. In some embodiments, the slidable elements 741b and 742b can be cylindrical bars, plates, or other slidable structure that can be actuated using any suitable type of sliding mechanism, such as slot and pin arrangement, sliding rail arrangement, pneumatic piston-cylinder arrangement, motor-actuated or other actuation devices. Actuation of these slidable mechanisms can be controlled via a controller discussed herein.

Other variations are also possible for the header 630. As one example, although discussion above describes the header 630 as having the first section 661 and the second section 662 to accommodate two items 109 in a depth direction, in some examples, a header of the transfer apparatus may be configured to include a single section to carry a single item 109 instead of two sections (e.g., 661 and 662) sized for two different item positions. In such as single section header, a claw assembly 640 or 740 may be disposed to allow direct drop off and pick up of an item. Further, to transfer items, a conveyor, retractable conveyor, or other transport assembly may be selectively extended and/or otherwise placed at least temporarily underneath the claw assembly.

Figure 9:
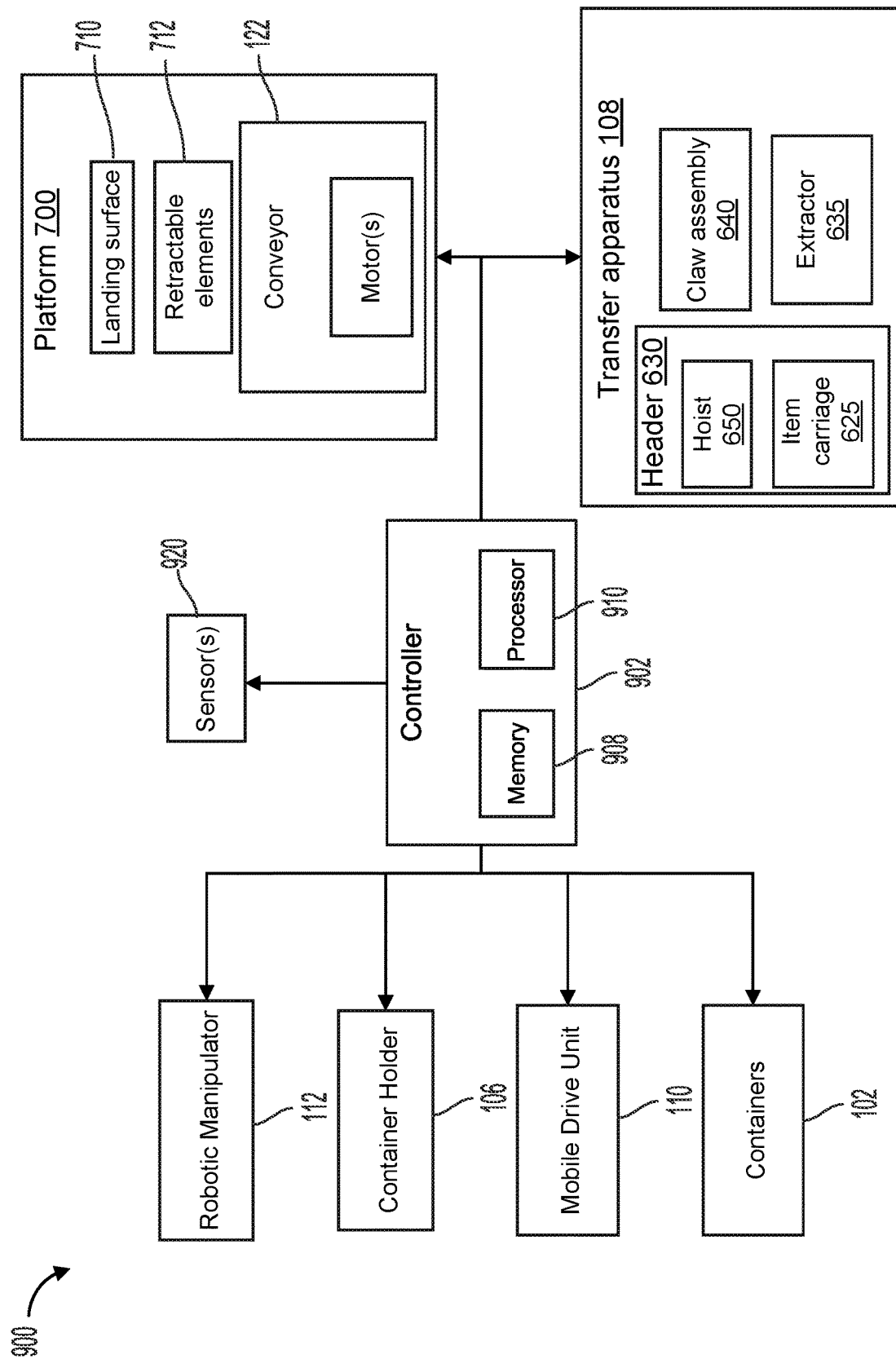
FIG. 9 is a simplified schematic diagram illustrating examples of control aspects that may be utilized in certain embodiments of the inventory system in accordance with various embodiments.

Turning to FIG. 9, a simplified schematic diagram 900 illustrating examples of control aspects that may be utilized in certain embodiments of the inventory system 100 of FIG. 1 is shown. A controller 902 can communicate information and/or instructions associated with the inventory system 100. The controller 902 can be in communication with the carrier 113, the inventory holder 104, the transfer apparatus 108 (e.g., including the item carriage, the claw assembly, and the laterally movable frame), the platform 700 (e.g., including the retractable elements and the conveyor 122), sensors, the inventory holder 104, the mobile drive unit 102, the items 109, other controllers (e.g., the controller 512 in FIG. 5) and/or respective components associated with such elements, such as graphically included within each element in FIG. 9. The controller 902 can communicate via a wired or wireless connection (e.g., Bluetooth). The controller 902 can include memory 908 and a processor 910. The memory 908 and the processor 910 can be included in a single structure. However, the memory 908 and processor 910 may be part of a system of multiple interconnected devices.

The memory 908 can include any type of memory device that retains stored information when powered off. The memory 908 can be or include electrically erasable and programmable read-only memory ("EEPROM"), flash memory, or any other type of non-volatile memory. In some examples, at least part of the memory 908 can include a medium from which the processor 910 can read instructions. A non-transitory computer-readable medium can include electronic, optical, magnetic, or other storage devices capable of providing the processor 910 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The processor 910 can execute instructions stored in the memory 908 to perform operations, for example, determining an item status based on item data. The processor 910 can include one processing device or multiple processing devices. Non-limiting examples of the processor 910 include a Field-Programmable Gate Array ("FPGA"), an application-specific integrated circuit ("ASIC"), a microprocessor, etc.

The controller 902 can be in communication with one or more sensors 920 positioned on or otherwise associated with the inventory holder 104, the transfer apparatus 108, the carrier 113 and/or the platform 700. The sensors 920 can be positioned to measure data associated with the items 109. For example, the sensors 920 can detect a label positioned on an item 109. Additionally or alternatively, the sensors 920 can detect a position of the items 109, the inventory holder 104, the conveyor 122, the carrier 113, and/or other elements of the inventory system 100. The sensors 920 can include an optical sensor, a scanner, a weight sensor, a camera, a Lidar system, an optical camera, and/or any suitable component for obtaining data associated with the item 109, and/or the inventory holder 104.

In various embodiments, the sensors 920 can additionally or alternatively measure data associated with any and/or all of the components of the inventory system 100. For example, the sensors 920 can measure data associated with the carrier 113, the inventory holder 104, the mobile drive unit 102, and/or the conveyor 122.

In various embodiments, the processor 910 of the controller 902 can include executable instructions, when executed causes operations of the item transfer process. For example, referring to FIGS. 3, and 6-8 and 11-24, the controller 902 can be configured to (e.g., by executable instructions on the processor 910) position an inventory holder 104 and a carrier 113. For example, the first inventory holder 104a can be positioned at the first assigned storage work cell 340a within the first set of storage work cells 340 and the first carrier 113a can be positioned at the first assigned delivery work cell 350a within the first delivery portion 350 of the first queue 120A. The controller 902 can be configured to swap or otherwise transfer, via the transfer apparatus 108, an item from the plurality of items between the first inventory holder 104a and the first carrier 113a within the first queue 120A. For example, the controller 902 can be further configured to extract, by actuating the extractor 635 of the transfer apparatus 108, the item from the plurality of items from the first inventory holder 104a, move the transfer apparatus 108 carrying the item adjacent to the first assigned delivery work cell 340a, and deliver the item to the first carrier 113a. Further, simultaneously while swapping in the first queue 120A, the second inventory holder 104b can be positioned at the second assigned storage work cell 360a within the second set of storage work cells 360 of the second queue 120B and the second carrier 113b can be positioned at the second assigned delivery work cell 370b within the second set of delivery cells 370. After swapping and/or transferring the item in the first queue 120A, the transfer apparatus 108 can be moved to the second operating space 326 of the second queue 120B. The controller 902 can be configured to swap and/or transfer, via the transfer apparatus 108, a second item from the plurality of items between the second inventory holder 104b and the second carrier 113b within the second queue 120B.

Figure 10:
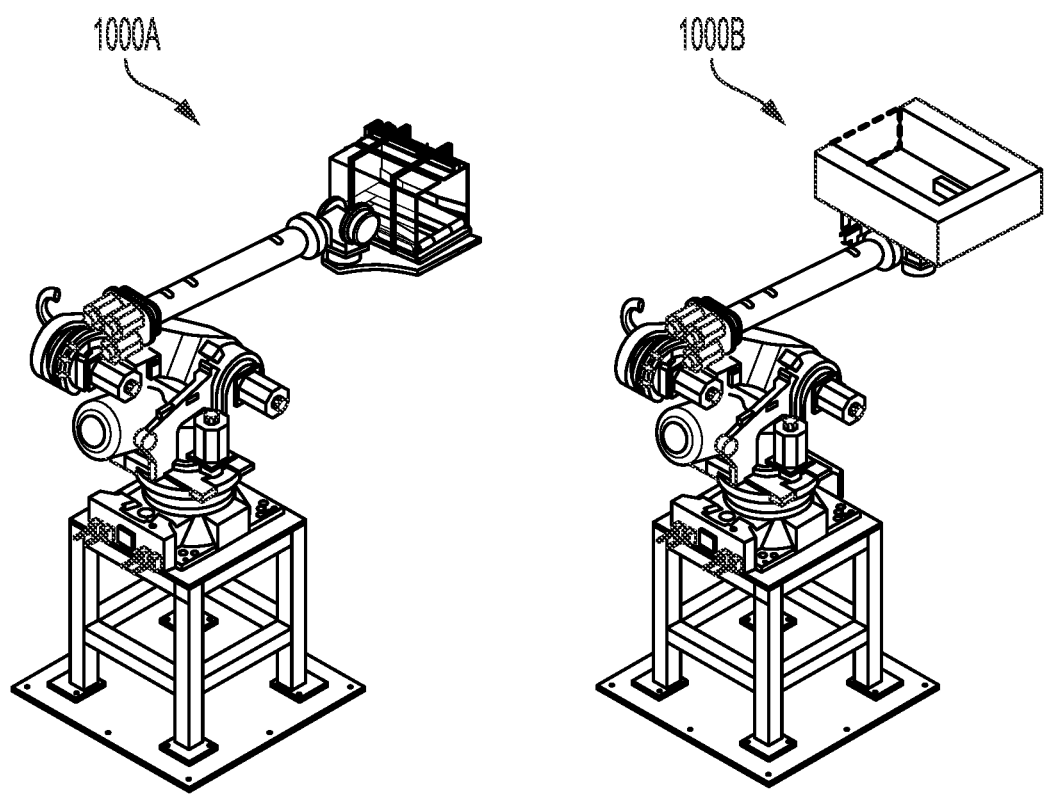
FIG. 10 illustrates additional examples of devices that may be utilized as transfer apparatuses in accordance with various embodiments.

FIG. 10 illustrates additional examples of devices 1000A and 1000B that may be utilized as transfer apparatuses 108. The device 1000A may include components and/or systems described in U.S. patent application Ser. No. 16/751,084, filed Jan. 23, 2020, entitled "CONTAINER TRANSPORTER,", which is hereby incorporated by reference herein in its entirety. The device 1000B may be include components and/or systems described in U.S. patent application Ser. No. 17/489,267, filed Sep. 29, 2021, entitled "END OF ARM TOOL INSERTER AND EXTRACTOR,", which is hereby incorporated by reference herein in its entirety. These or other forms of transfer apparatuses 108 may be utilized in lieu of or in addition to other forms described herein.

In some embodiments, the devices 1000A and 1000B can be mounted on a rail or other linear slide axis apparatus configured to facilitate movement in the lateral movement within the work envelope and/or within operating spaces of the queues 120A and 120B (e.g., in FIG. 3). For example, such an arrangement may allow the devices 1000A and/or 100B to move back-and-forth between the queues 120A and 120B to transfer items in an efficient manner. Additionally or alternatively, the devices 1000A and 1000B may be fixed in a particular position and include suitable range of motion to reach each of the queues 120A and 120B.

FIGS. 11-15 illustrate assorted states of an example inventory handling process or method using a two-headed transfer apparatus 108 employed in a pendulum queue system (e.g. discussed with respect to FIG. 3). However, the present disclosure is not limited to such steps or two-headed configuration. A person of ordinary skill in the art can employ a single headed transfer apparatus and control its movements to perform an inventory handling process efficiently to complete the item transfer process within a given time interval (e.g., 3 to 8 seconds, or preferably in less than 6 seconds).

The first queue 120A and the second queue 120B of FIGS. 11-15 can be configured as discussed with respect to FIG. 3. For visualization and further clarity in the following discussion, when referring to an item transfer within the first queue 120A, an inventory holder at the first assigned storage location 340a is referred as a first inventory holder SA1, and another inventory holder to be subsequently moved to the first assigned storage location 340a may be referred as a subsequent inventory holder SA2 (e.g., at a storage cell 340b). Similarly, a carrier at the first assigned delivery location 350a is referred as a first carrier CA1, and another carrier to be subsequently moved to the first assigned delivery location 350a may be referred as a subsequent carrier CA2 (e.g., at a delivery cell 350f). Similarly, when referring to item transfer within the second queue 120B, references to a second inventory holder SB1, a subsequent inventory holder SB2, a second carrier CB1, and a subsequent carrier CB2 are used. The direction of moving of the transfer apparatus, carriers, inventory holders, and items are indicated by arrows (in bold). For example, the transfer apparatus 108 movements are indicated by arrows connected to the box labeled 108, item movements are indicated by arrows connected to items (e.g., boxes labelled iA1, oA1, iA2, oA2), inventory holder movements are indicated by arrows connected to inventory holders (e.g., boxes SA1 and SB2), and carrier movements are indicated by arrows connected to the carriers (e.g., boxes CA1, CA2, CB1, CB2). At any given state, multiple components can be moved or cycled to facilitate quick item transfer. For example, while the items iA1 and oA1 are being transferred within the first queue 102A, the inventory holders SB1, SB2 and carriers CB1, CB2 can be cycled as indicated by the respective arrows (and/or in other motions suitable to position elements in one queue during operation of the transfer apparatus 108 in the other queue).

Figure 11:
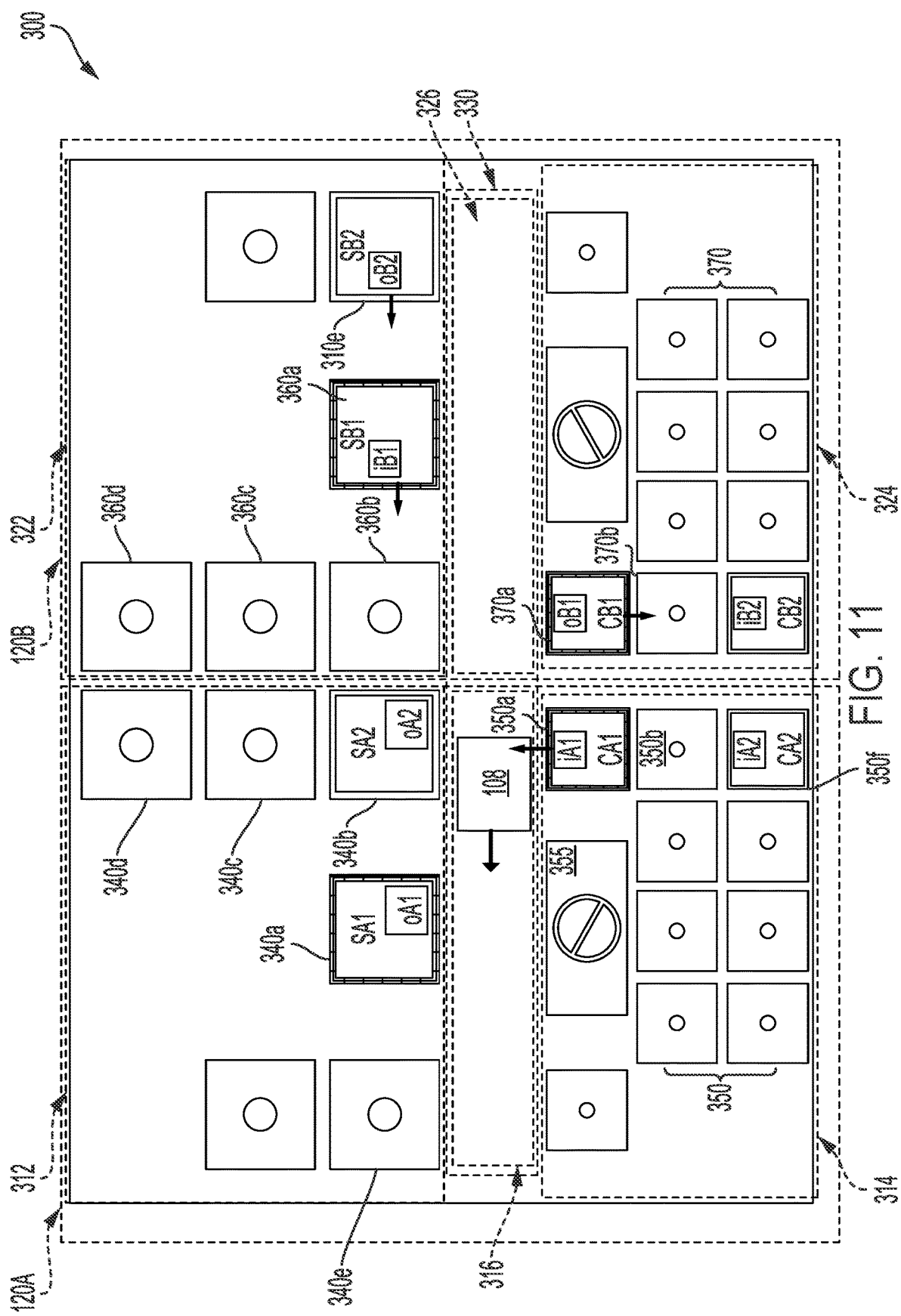
FIGS. 11 through 15 illustrate assorted states in an example of an item transferring process using a two header configuration of the transfer apparatus employed within a pendulum queue system in accordance with various embodiments.

In a state shown in FIG. 11, the first inventory holder SA1 includes a first outbound item oA1 to be exchanged with a first inbound item iA1 on the first carrier CA1. The transfer apparatus 108 (e.g., having a two-headed configuration shown in FIG. 6) can be moved within the first operating space 316 to align with the assigned delivery location to pick up the first inbound item iA1 from the carrier CA1. The transfer apparatus 108 can then pick up the first inbound item iA1 (e.g., into a first header 630 illustrated in FIG. 6). For example, the claw assembly 640 of the first header 630 can be used to pick up the inbound item iA1, as discussed earlier. Then, the transfer apparatus 108 can carry the first inbound item iA1 and move towards the first inventory holder SA1.

Figure 12:
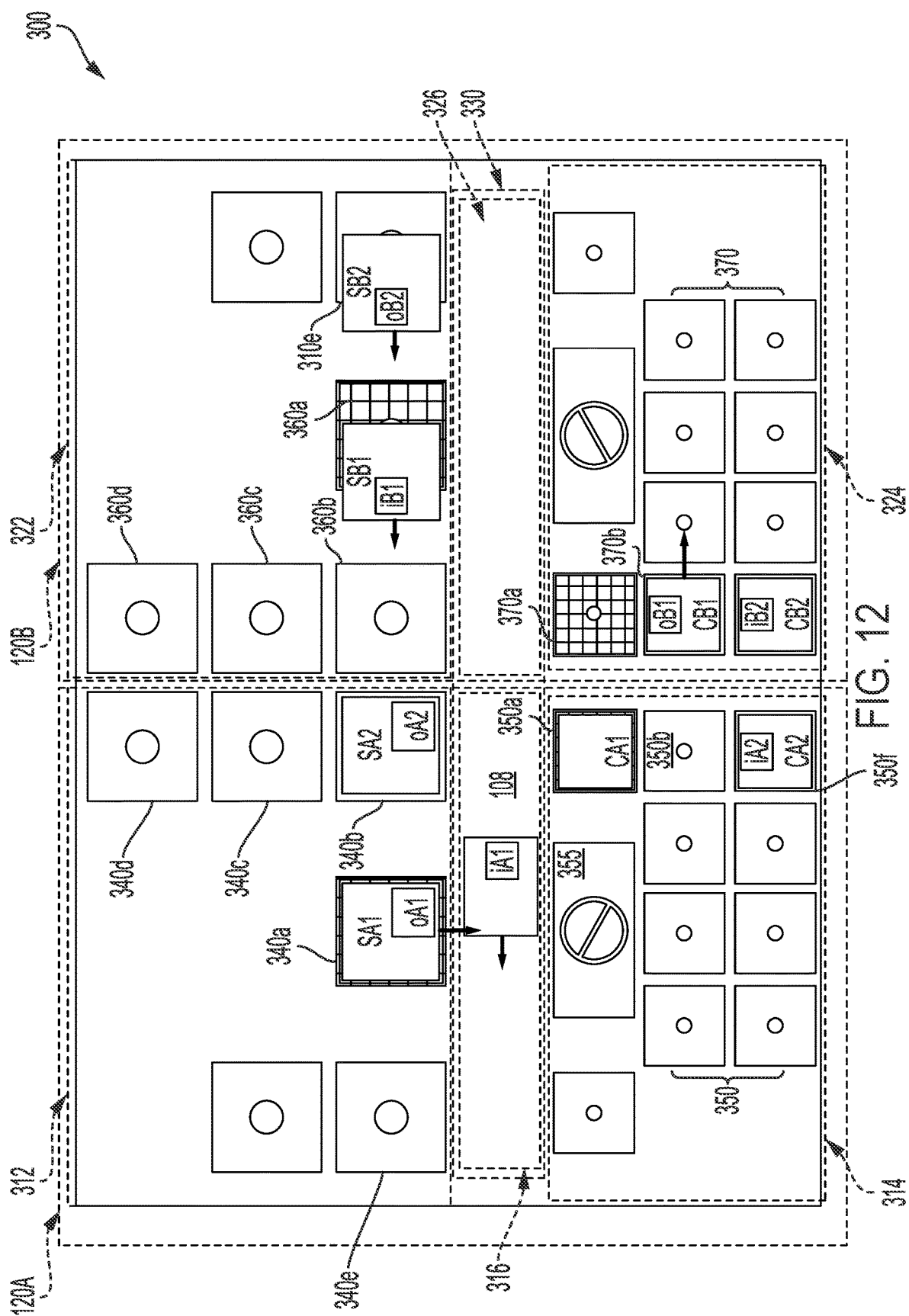

As shown in a state of FIG. 12, the transfer apparatus 108 can be aligned with the first outbound item oA1 to extract the item (e.g., via a second header 630A illustrated in FIG. 6), which may create an empty space within the first inventory holder SA1. For example, the first outbound item oA1 can be extracted using the extractor 635 into the item carriage 625, as discussed earlier. The two headers 630 and 630A being adjacent to each other on the same transfer apparatus 108 may facilitate exchanging of items by slightly moving the transfer apparatus 108, e.g., by an amount of a center distance between the headers 630 and 630A. For example, after extracting the first outbound item oA1, the transfer apparatus 108 can be moved slightly to align the first inbound item iA1 with the empty space within the first inventory holder SA1, as shown in a state of FIG. 13.

Figure 13:
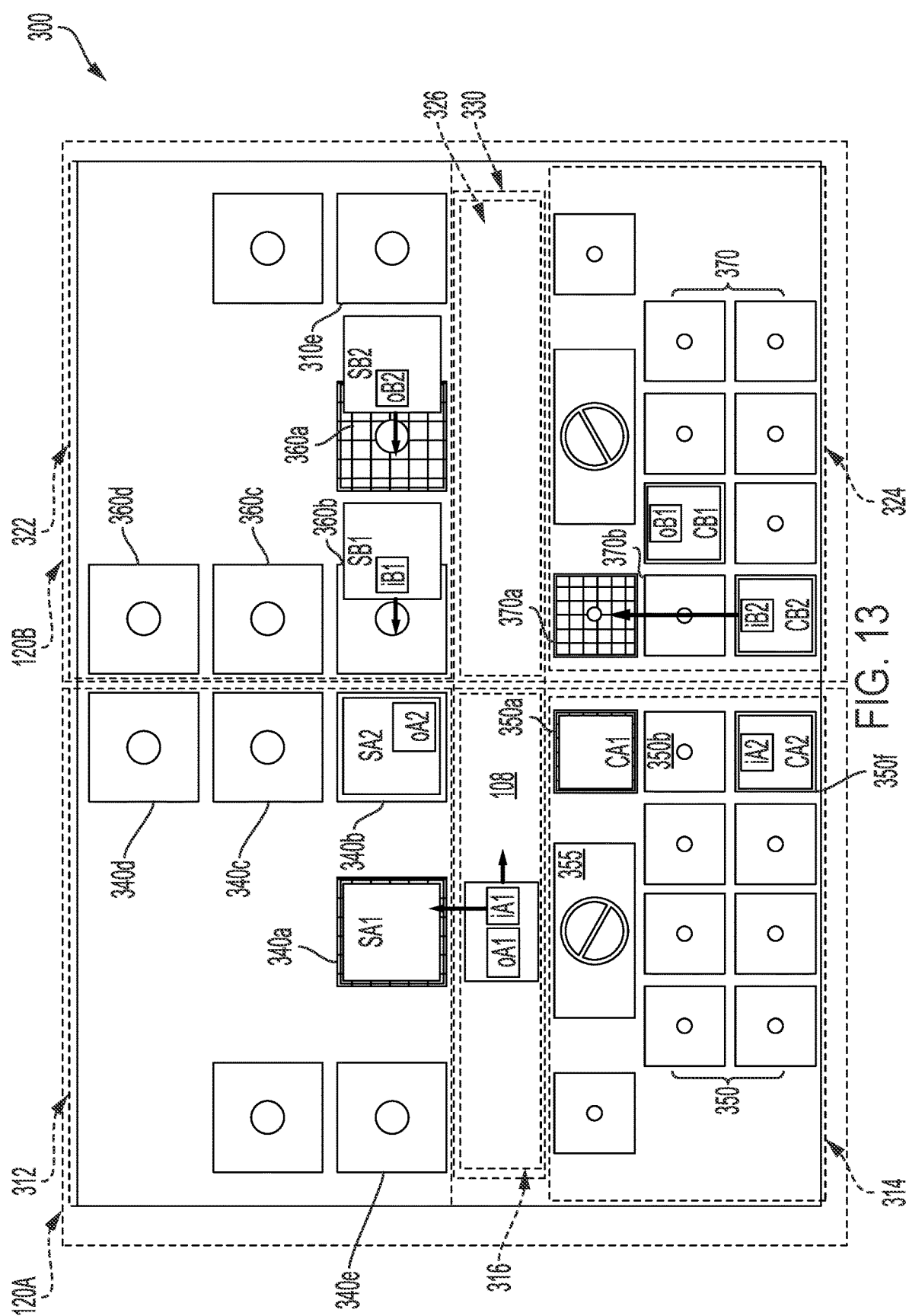

FIG. 13 also illustrates that both the first inbound item iA1 and the first outbound item oA1 can be held on the transfer apparatus 108 facilitating quick extraction and delivery with minor lateral position adjustments. Thus, after adjusting the position, the first inbound item iA1 can be pushed into the space previously occupied by the first outbound item oA1. For example, the extractor 635 in the first header 630 may be actuated to push the first inbound item iA1 into the first inventory holder SA1. In another example, the first inbound item iA1 may be pushed into another empty space within the first inventory holder SA1. For example, the first header 630 may be moved vertically to align with another empty space and then the extractor 635 may be actuated to push the first inbound item iA1. Upon delivering the first inbound item iA1, the transfer apparatus 108 can be moved toward the first carrier CA1 to facilitate further operations shown in FIG. 14.

Figure 14:
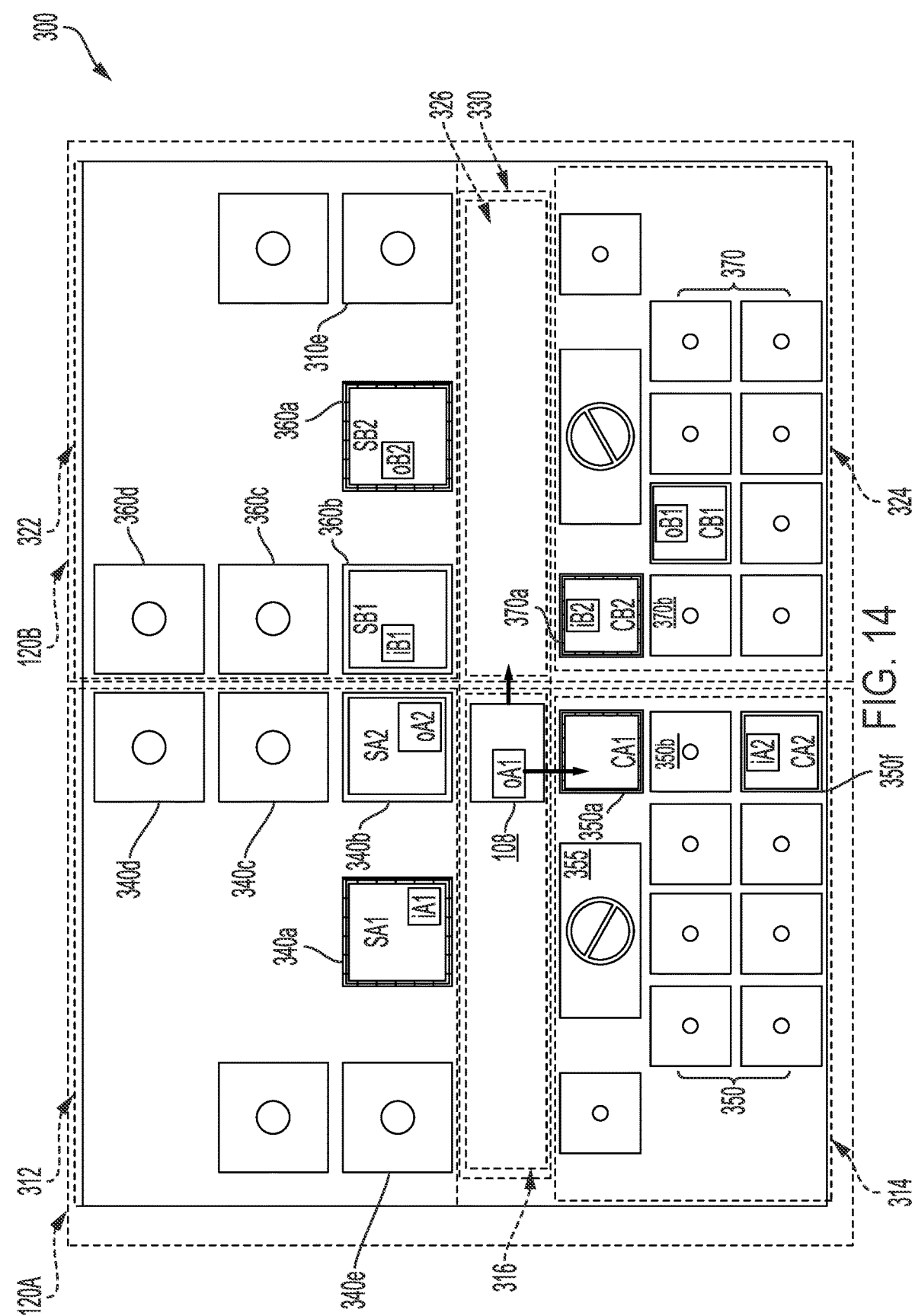

In the state shown in FIG. 14, transfer apparatus 108 can align with the first carrier CA1 for delivering of the first outbound item oA1. For example, the second header 630A of the transfer apparatus 108 can be vertically aligned over the first carrier CA1 to deliver the first outbound item oA1. To this end, the header 630A can be lowered over the first carrier CA1 and the claw assembly 640 can be opened to release the first outbound item oA1. As discussed, the first outbound item oA1 can be directly dropped off from a bottom open portion by opening the claw assembly 630 to facilitate a quick drop off. Upon transferring the items iA1 and oA1, the transfer apparatus 108 can be moved to the second operating space 326 to exchange items within the second queue 120B in a similar manner.

Figure 15:
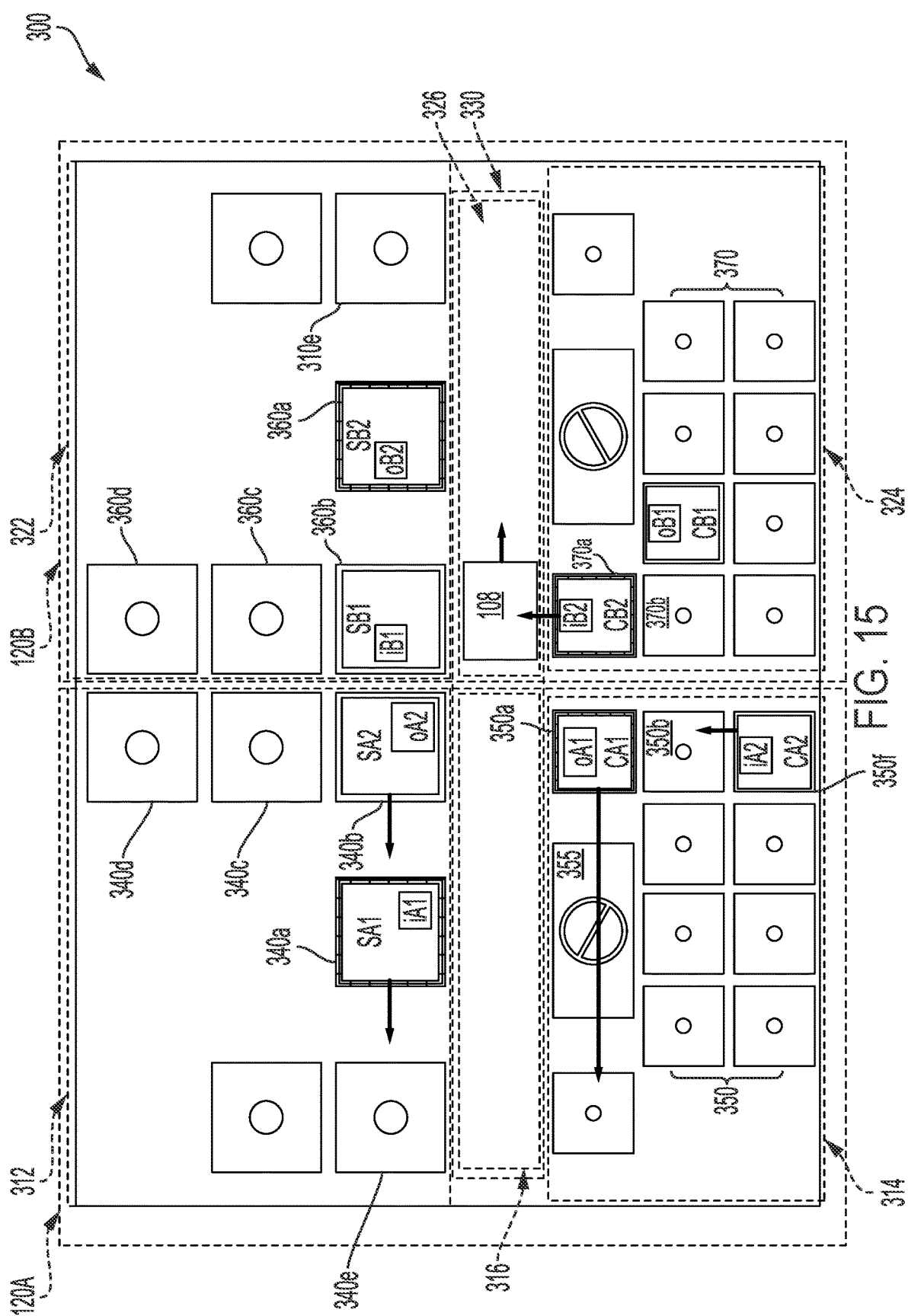

Referring to FIG. 15, the inventory holders SA1 and SA2 and the carriers CA1 and CA2 can be cycled in the first queue 120A to prepare for transferring of items iA2 and oA2 at the assigned locations 340a and 350a. For example, the subsequent inventory holder SA2 can be moved towards the assigned storage location 340a, while the first inventory holder SA1 can be moved away from the assigned storage location and the subsequent carrier CA2 can be moved towards the assigned delivery location 350a while the first carrier CA1 is moved away, such as illustrated by the arrows. In the depicted example, the first carrier CA1 is shown traversing across the clearance cell 355 (e.g., illustrating that a given clearance cell may be suitable for travel when the transfer apparatus 108 is in an opposite queue and thus posing no risk of collision), although cycling may be accomplished by use of any other suitable path (e.g., which may include, but is not limited to, stepwise movements around a clearance cell, such as depicted for the carrier CB1 in FIGS. 11 and 12). Simultaneously, while cycling occurs in the first queue 120A, the transfer apparatus 108 can operate in the second operating space 326 of the second queue 120B to exchange the items iB2 and oB2 in a similar manner as discussed with respect to the first queue 120A.

Referring back to FIGS. 11-14, in addition to the cycling in the first queue 120A, cycling of inventory holders SB1 and SB2 and the carriers CB1 and CB2 within the second storage portion 322 and the second delivery portion 324 is also illustrated as indicated by the arrows. As the cycling operation in the second queue 120B occurs simultaneously while the items iA1 and oA1 are being transferred in the first queue 120A, the second queue 120B is ready for item transfer for the transfer apparatus 108. Hence, when the transfer apparatus 108 moves into the second operating space 326, as shown in FIG. 15, the transfer apparatus 108 can readily exchanges items without any wait or delay associated with positioning of the items in the second queue 120B. Additionally, although a particular sequence or speed of movement is illustrated by the arrows in FIGS. 11-14 for the second queue 120B, it may also be understood that other rates of movement may be utilized. For example, elements may cycle faster to reach assigned positions with more lead time ahead of the transfer apparatus 108 or slower to arrive with less lead time.

FIGS. 16-20 illustrate assorted states in another example of transferring items, where the queues 120A and 120B are further configured to include additional platforms at assigned delivery locations. In the example illustrated, each of the queues 120A and 120B includes two platforms 700A and 700B positioned within the assigned delivery location (e.g., 314 and 324). The platforms 700A and 700B can be instances of the platform 700, discussed with respect to FIG. 7-8. The transfer apparatus 108 used in the FIGS. 16-20 may be a single header transfer apparatus or a two header transfer apparatus. Transferring items within the configuration of FIGS. 16-20 may involve several similar movements of the transfer apparatus 108 discussed with respect to FIGS. 11-15, and as such are not discussed in detail again for brevity.

Figure 16:
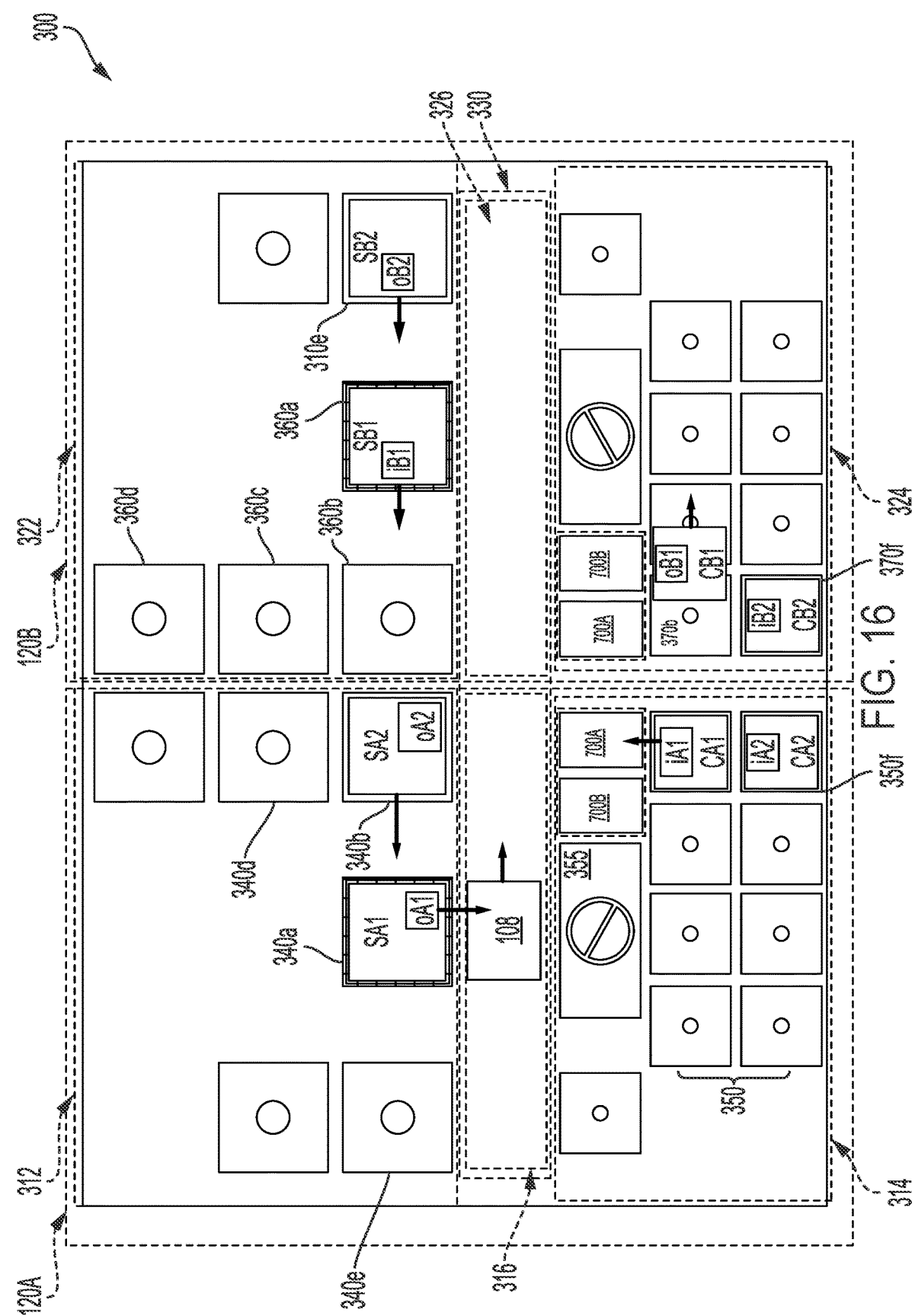
FIGS. 16 through 20 illustrate assorted states in another example of an item transferring process using a single header configuration of the transfer apparatus and platforms employed within a pendulum queue system in accordance with various embodiments.

Referring to FIG. 16, the first inventory holder SA1 may be positioned for transferring the first outbound item oA1 to the transfer apparatus 108. In some examples, the first inbound item iA1 may not yet be at the assigned location (e.g., 700A) at the same time. For example, while the first outbound item oA1 is being loaded on the transfer apparatus 108, the first inbound item iA1 can be moved to the platform 700A from the first carrier CA1. However, in some examples, the first item iA1 may be loaded before, during, or after loading of the first outbound item oA1. In any event, after the first outbound item oA1 is loaded, the transfer apparatus 108 can be moved towards the platforms 700A and 700B within the first operating space 316. Thus, within a time period from loading the first outbound item oA1 to arriving at the platform 700A, the first inbound item iA1 can be ready for transfer. The platforms 700A and 700B may facilitate cycling of the carriers within the delivery portion 312 without waiting for the transfer apparatus 108 to pick up the item iA1.

Figure 17:
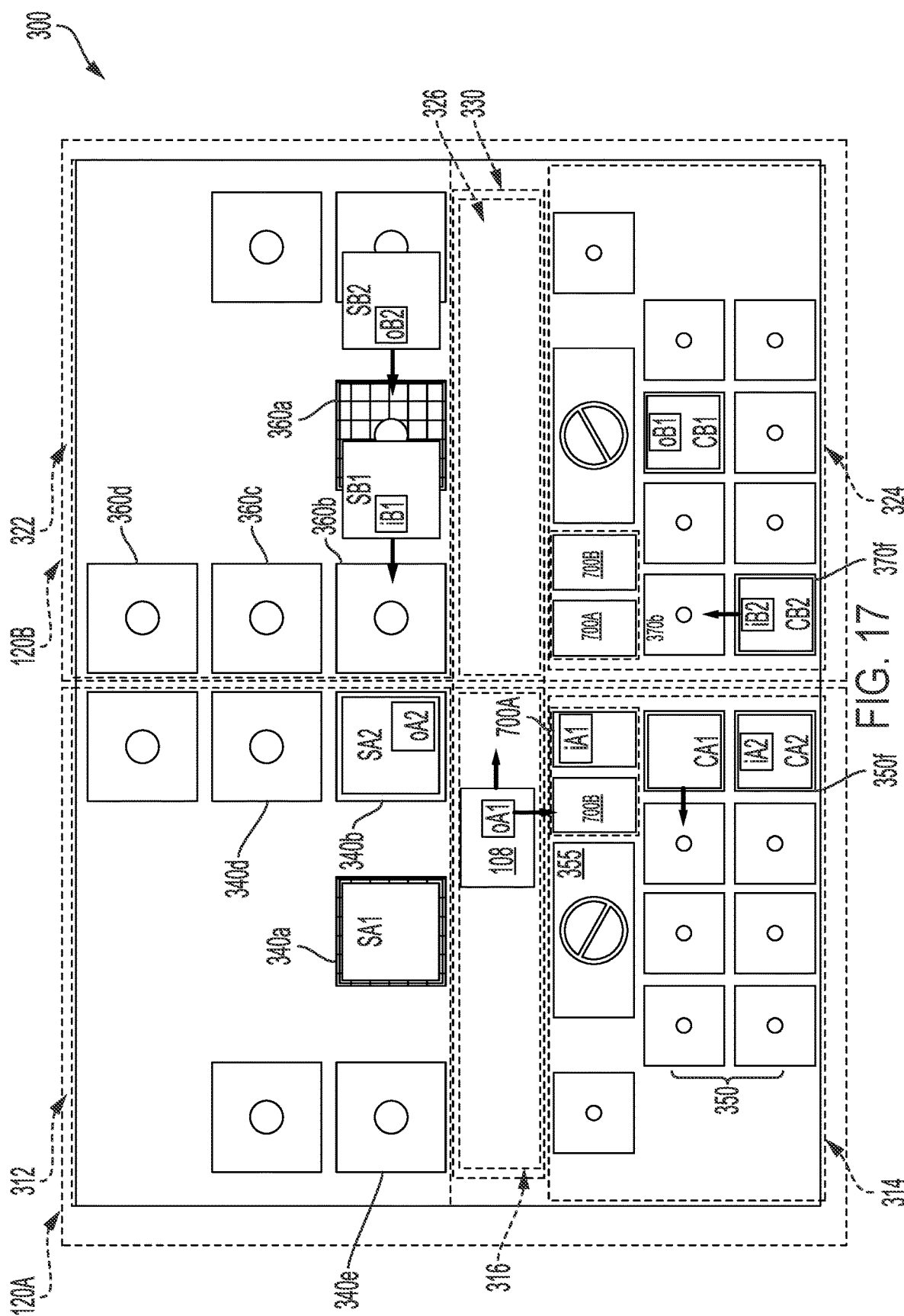
Figure 18:
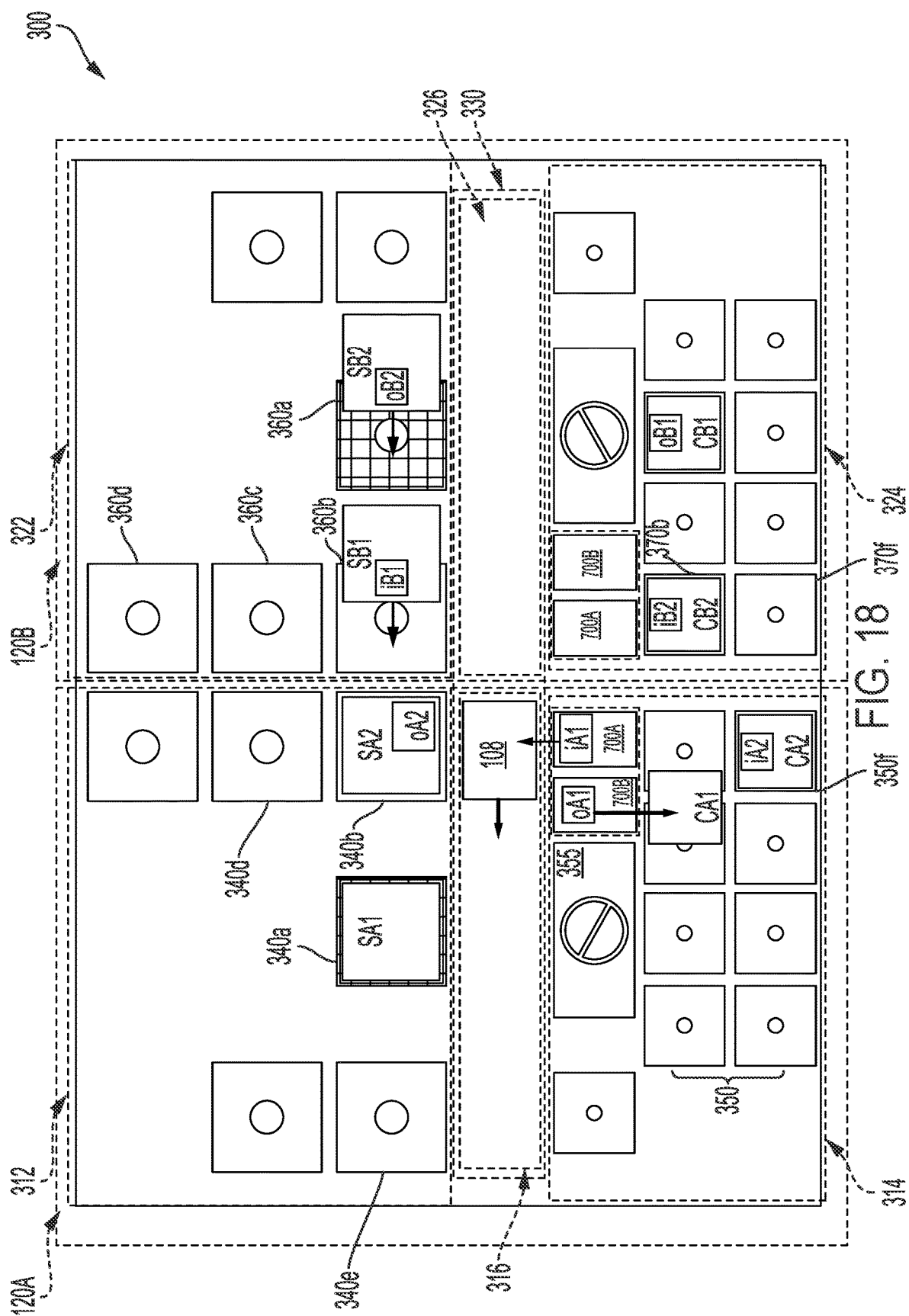

As shown in FIG. 17, the first outbound item oA1 can be aligned with the platform 700B to deliver the first outbound item oA1 to the platform 700B. At the same time, the first carrier CA1 can be moved to a suitable position to pick up the first outbound item oA1 while creating space to cycle the subsequent carrier CA2. After delivering the first outbound item oA1, the transfer apparatus 108 can be slightly moved towards the platform 700A (e.g., to the position shown in FIG. 18). As shown in FIG. 18, the transfer apparatus 108 may receive the first inbound item iA1 while the first carrier CA1 receives the first outbound item oA1. Thus, a single carrier e.g., the first carrier CA1 can perform delivery of the first inbound item iA1 and pick up of the first outbound item oA1 without affecting a total transfer time of the transfer apparatus 108. After receiving the first inbound item iA1, the transfer apparatus 108 can be moved towards the first inventory holder SA1.

Figure 19:
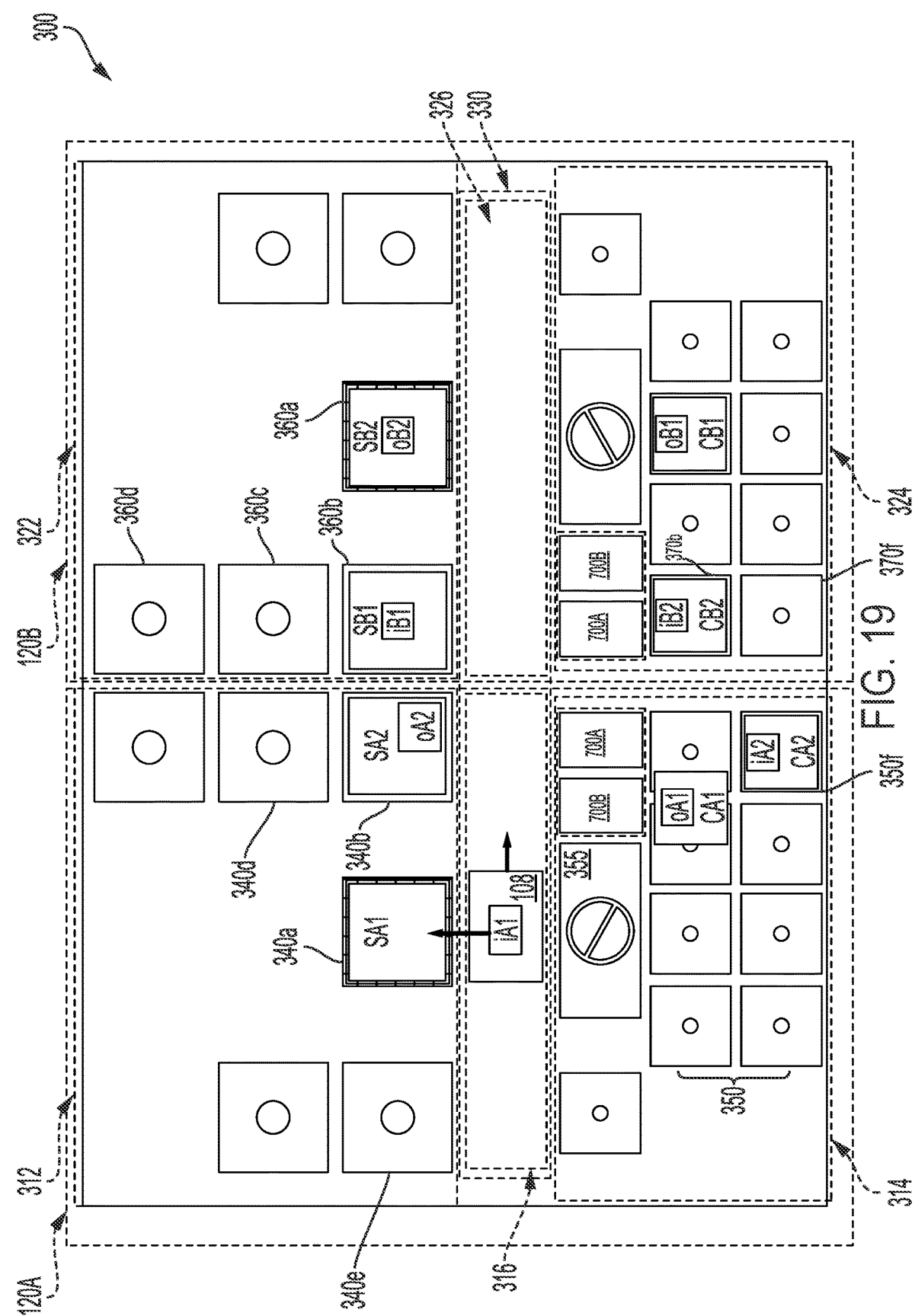

Referring to FIG. 19, the first inbound item iA1 can be aligned with an empty space (e.g., a space previously occupied by the first outbound item oA1) and pushed into the first inventory holder SA1 by controlling movements of the transfer apparatus 108 along the vertical direction and the depth direction. After completing the transfer process of items iA1 and oA1, the transfer apparatus 108 can be moved to the second operating space 326 of the second queue 120B, e.g., toward the position shown in FIG. 20. It may also be observed that FIGS. 16-19 also illustrate a cycling of inventory holders SB1 and SB2 to position the inventory holder SB2 at the assigned storage location 360a and cycling of the carriers CB1 and CB2 to position the carrier CB2 at the assigned delivery location 370a so that the items oA2 and iA2 are ready to be transferred when the transfer apparatus moves to the second queue 120B.

Figure 20:
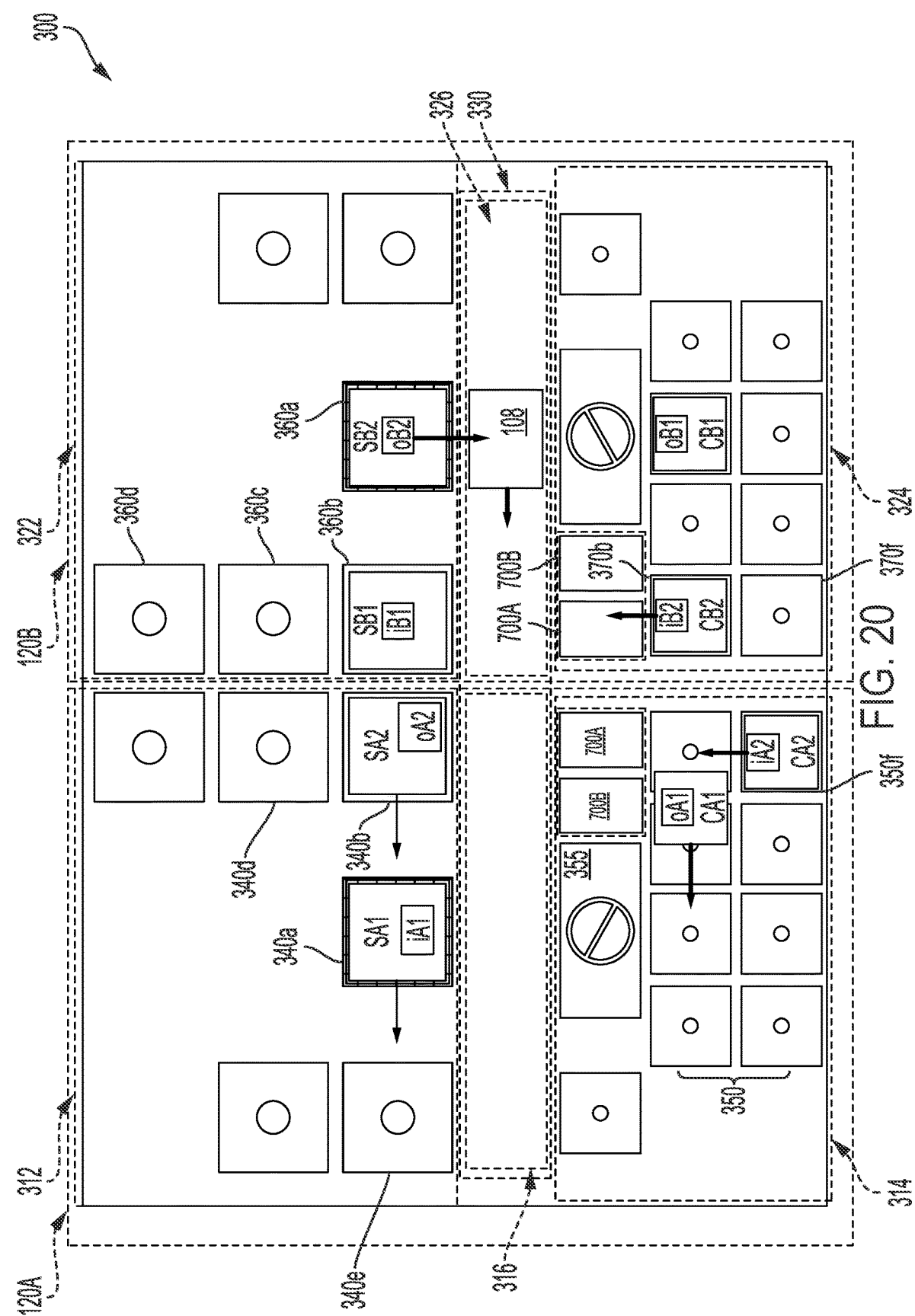

Referring to FIG. 20, within the second queue 120B, the items oB2 and iB2 are ready to be transferred to the apparatus 108. The items oB2 and iB2 can be transferred in a similar manner as discussed with respect to the first queue 120A. While the item transfer in the second queue 120B occurs, cycling of the inventory holders SA1 and SA2 and the carriers CA1 and CA2 can be activated (e.g., as illustrated by the arrows and/or at suitable other rates and/or sequences) so that the items oA2 and iA2 are ready to be transferred when the transfer apparatus moves back to the first queue 120A.

FIGS. 21-24 illustrate assorted states in an example of transferring items involving simultaneous pick and delivery of an item. The queues 120A and 120B may be configured in a similar manner as shown in FIGS. 16-20 to includes platforms 700A and 700B at assigned delivery locations. The transfer apparatus 108 can have two headers (e.g., including the first header 630 and the second header 630A shown in FIG. 6) and/or may otherwise be configured to facilitate the simultaneous pick up and delivery of respective items. Transferring items within the configuration of FIGS. 21-24 may involve several similar movements of the transfer apparatus 108 discussed with respect to FIG. 11-14, as such every move may not be discussed in detail for brevity of discussion below.

Figure 21:
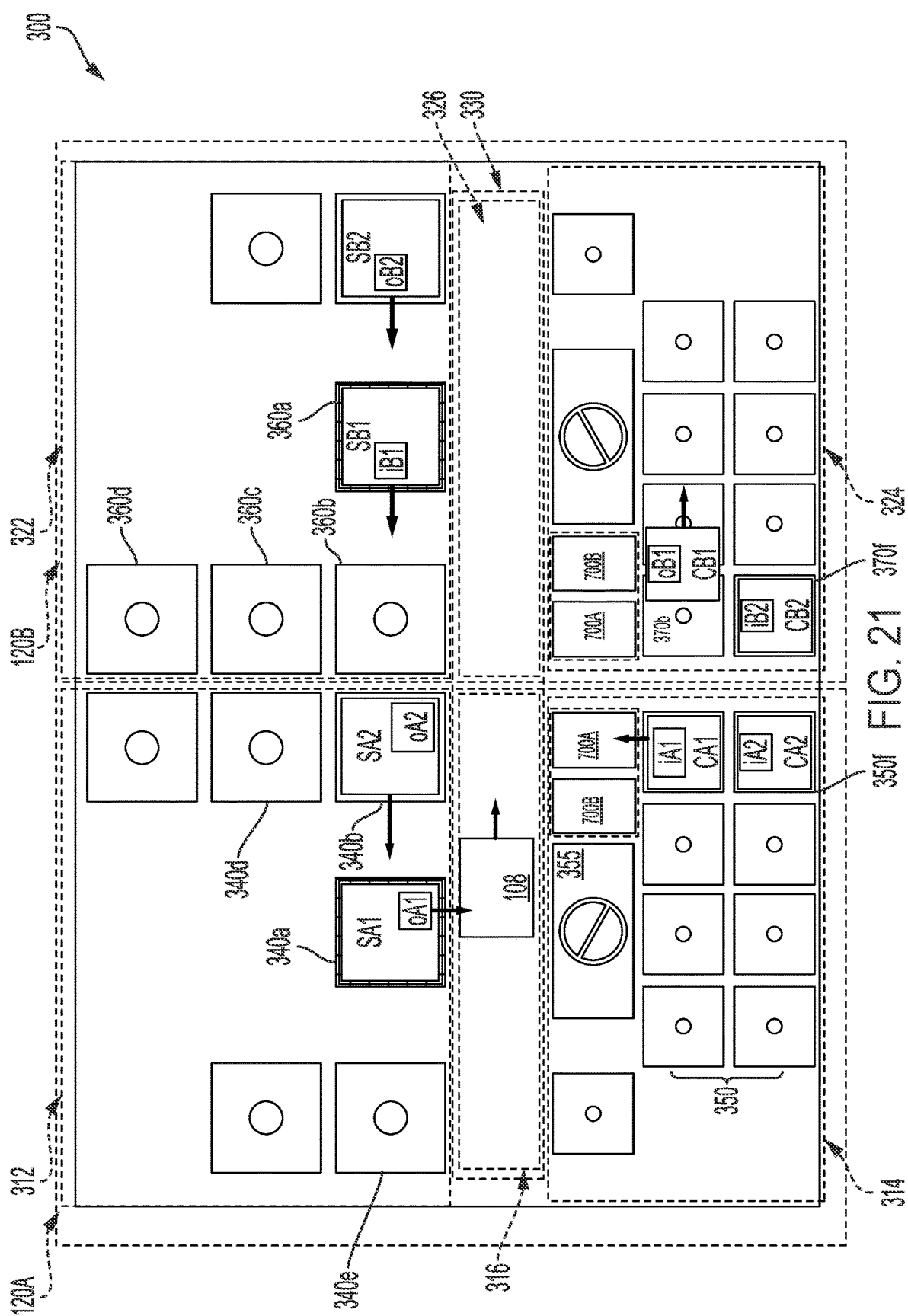
FIGS. 21 through 24 illustrate assorted states in yet another example of an item transferring process involving simultaneous pick up and drop off of items using a two header configuration of the transfer apparatus and platforms within a pendulum queue system in accordance with various embodiments.
Figure 22:
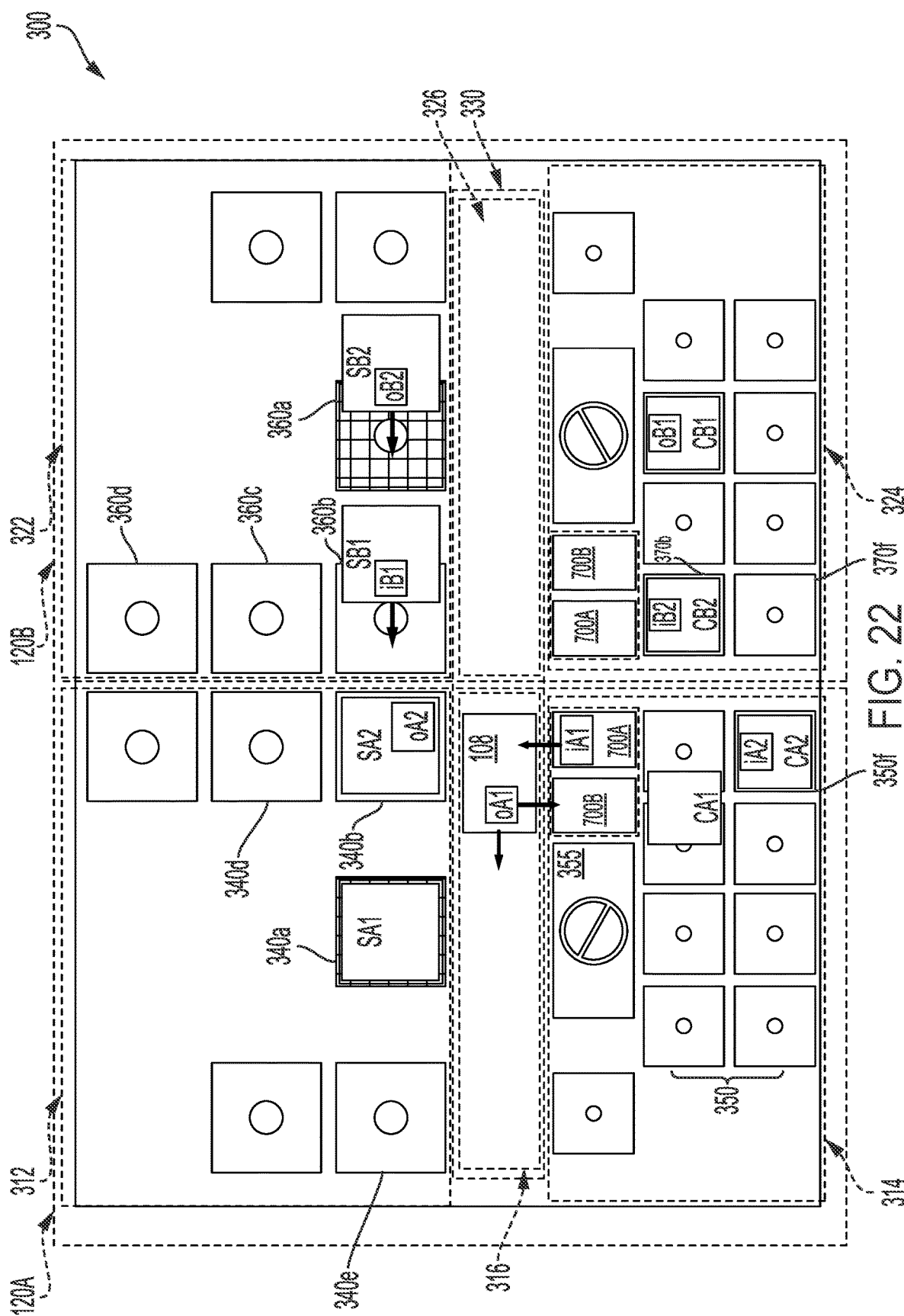

Referring to FIG. 21, the first outbound item oA1 can be loaded into transfer apparatus 108 (e.g., into the second header 630A), while the first inbound item iA1 can be moved to the platform 700A from the first carrier CA1. After loading the first outbound item oA1, the transfer apparatus 108 can be moved towards the platforms 700A and 700B within the first operating space 316. The transfer apparatus 108 can be moved to align with both platforms 700A, 700B (e.g., such that the first header 630 aligns with the platform 700A and the second header 630A aligns with the platform 700B), as shown in FIG. 22. In FIG. 22, the first outbound item oA1 can be delivered to the platform 700B and simultaneously the first inbound item iA1 can be picked up from the platform 700A into the first header 630. The simultaneous pick up and drop off at a particular assigned location can save time spent in minor adjustments performed in a serial pick up and drop off at the particular assigned location. After the transfer operation at the platforms 700A and 700B, the transfer apparatus 108 can be moved towards the first inventory holder SA1, e.g., toward the position in FIG. 23.

Figure 23:
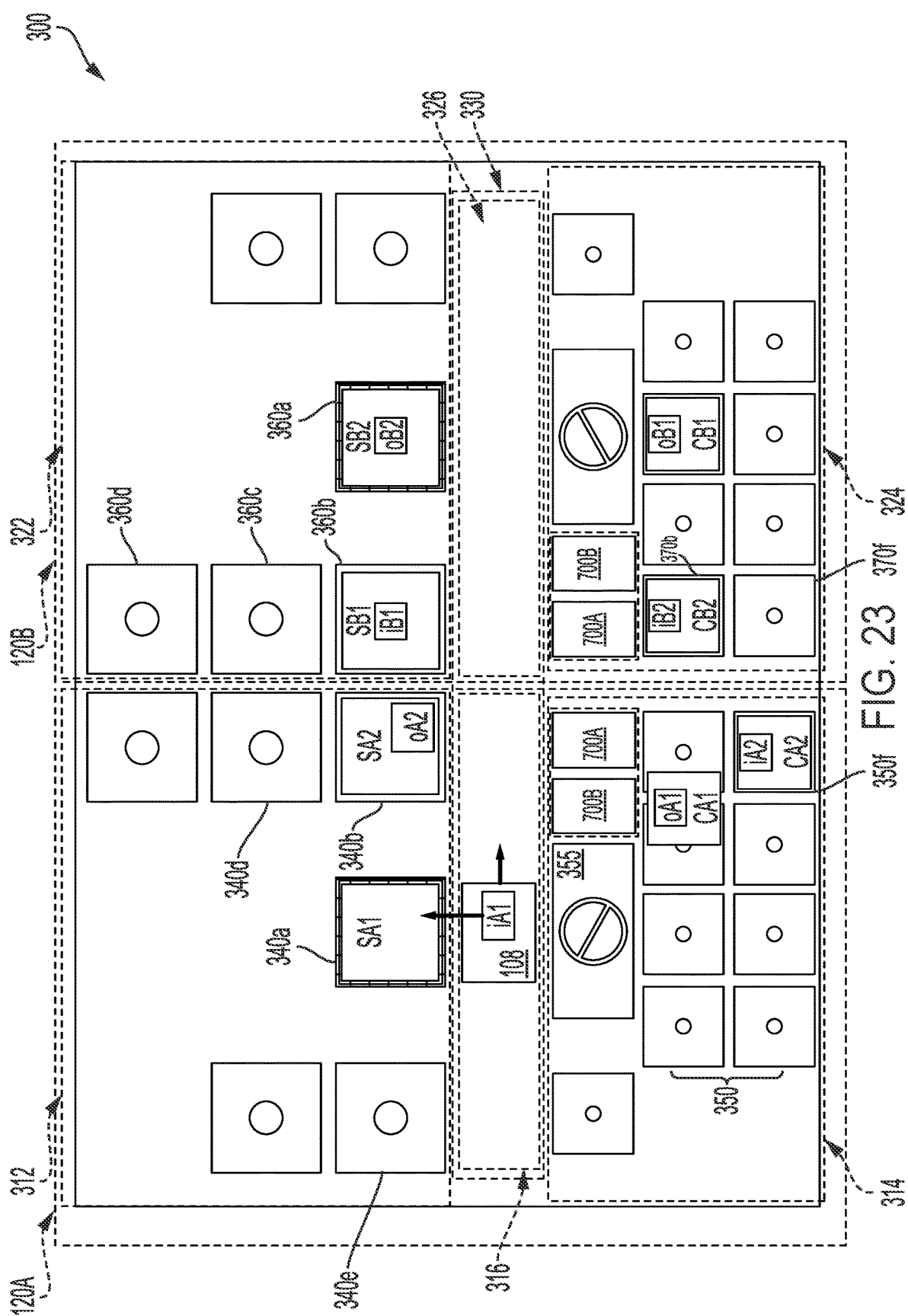
Figure 24:
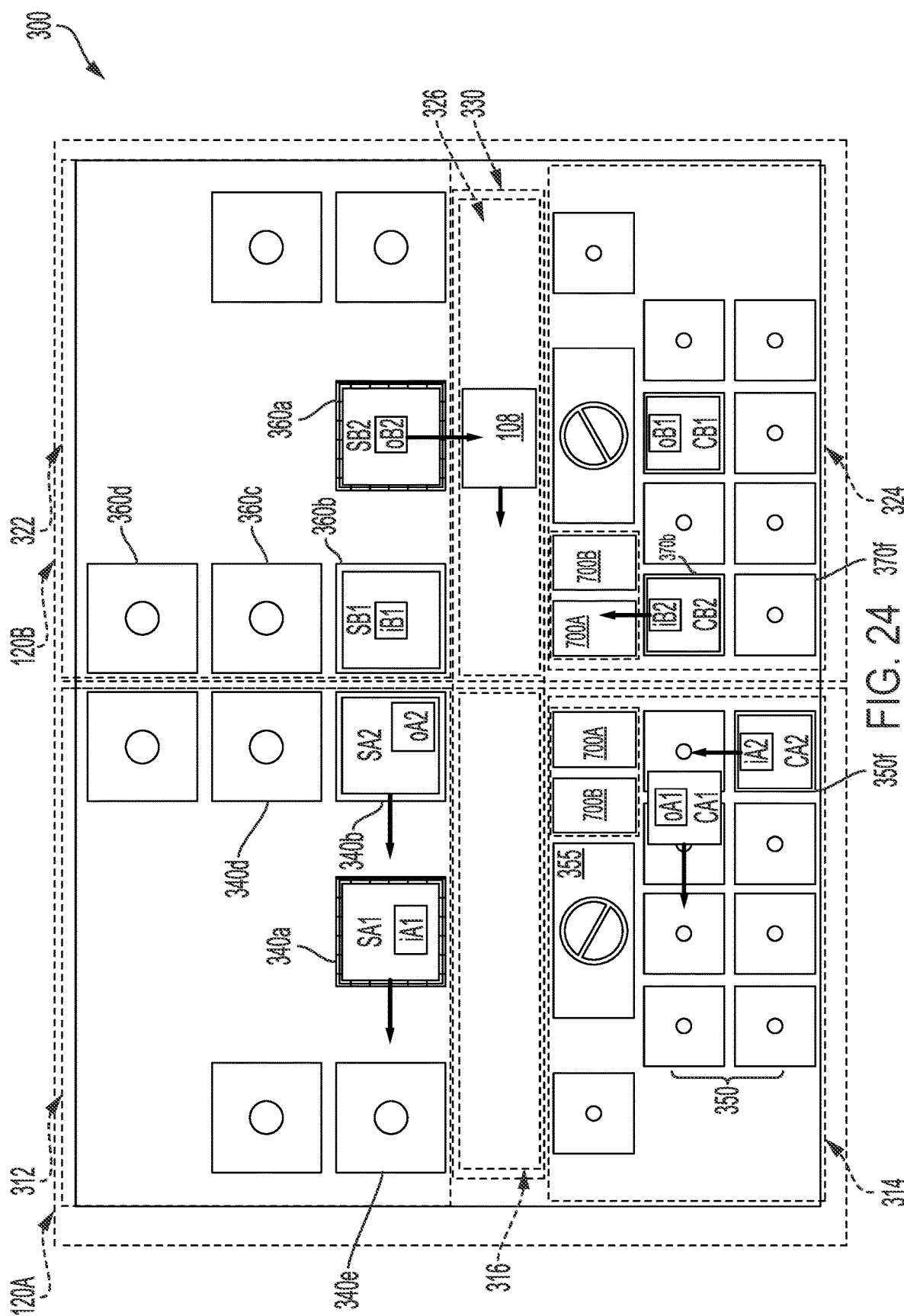

Referring to FIG. 23, the transfer apparatus 108 (e.g., the first header 630 carrying the first inbound item iA1) can be aligned with an empty space (e.g., a space previously occupied by the outbound item oA1) and pushed into the first inventory holder SA1, such as by controlling movements of the transfer apparatus 108 along the vertical direction and the depth direction. After completing the transfer process of items iA1 and oA1, the transfer apparatus 108 can be moved to the second operating space 326 of the second queue 120B, such as toward the position shown in FIG. 24. Further, starting from the position shown in FIG. 24, items oB2 and iB2 can be transferred within the second queue 120B in a similar manner as discussed with respect to the first queue 120A.

Referring back to FIGS. 21-23, while the items iA1 and oA1 are being transferred in the first queue 120A, a cycling between inventory holders SB1 and SB2 and the carriers CB1 and CB2 can occur (e.g., as illustrated by the arrows and/or at suitable other rates and/or sequences), so that the second queue 120B is ready for item transfer.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   a queue comprising a storage portion and a delivery portion separated by an operating space, the storage portion being configured to receive inventory holders and the delivery portion being configured to receive carriers;
   a transfer apparatus operable to perform item transferring operations for the queue, the transfer apparatus comprising:
      a laterally movable frame movable at least within the operating space;
      an upright frame supported by the laterally movable frame; and
      a header movably coupled to the upright frame and configured to move in a vertical direction, wherein the header comprises:
         an item carriage having a bottom open portion;
         an extractor coupled to the item carriage to pull an item from an inventory holder into the item carriage over the bottom open portion; and
         a claw assembly disposed along the bottom open portion of the item carriage and configured to open for releasing the item through the bottom open portion; and
   a controller configured to control movement of the laterally movable frame within the operating space of the queue, the header in the vertical direction to align with the item from the inventory holder in the storage portion, the extractor to pull the item from the inventory holder into the item carriage and into position over the claw assembly, and the claw assembly to open to release the item so as to be directly dropped off onto a carrier in the delivery portion.

2. The system of claim 1, wherein the extractor comprises a suction cup configured to translate along a depth axis perpendicular to the lateral direction and the vertical direction; and
   the header is drivable by at least one of: a rack and pinion, a ball screw assembly, or a pulley assembly installed on the upright frame.

3. The system of claim 1, wherein the claw assembly is further configured to close to collect and support the item underneath the bottom open portion; and the controller is further configured to control movement of the claw assembly to close around the item to pick up the item from the carrier at the delivery location.

4. The system of claim 1, wherein the laterally movable frame and the header are configured to move simultaneously during transferring of the item.

5. A transfer apparatus comprising:
   a laterally movable frame moveable in a lateral direction;
   an upright frame supported by the laterally movable frame; and a header movably coupled to the upright frame and configured to move in a vertical direction, wherein the header comprises:
an extractor; and
a claw assembly configured to open and close, wherein the extractor is configured to pull an item over the claw assembly in a closed state, and the claw assembly is configured to open for releasing the item directly over a carrier.

6. The transfer apparatus of claim 5, wherein the header further comprises:
an item carriage extending along a depth direction perpendicular to the lateral direction and the vertical direction;
wherein the extractor is coupled to the item carriage and configured to pull an item from an inventory holder into the item carriage.

7. The transfer apparatus of claim 6, wherein the claw assembly is further configured to close around an item to be picked up and the extractor is further configured to push the picked up item into the inventory holder.

8. The transfer apparatus of claim 7, wherein the item carriage further comprises a bottom portion and wherein the claw assembly comprises at least one of:
pivotable elements attached to the item carriage to pivotably open the bottom portion and release the item, or close around the item to be picked up from the bottom portion into the item carriage; or
slidable elements attached to the item carriage to slidably open the bottom portion, or slidably close the bottom portion.

9. The transfer apparatus of claim 6, wherein the item carriage comprises:
a section configured for item transfer in the depth direction and in the vertical direction, wherein the claw assembly is disposed along the section.

10. The transfer apparatus of claim 6, wherein the item carriage comprises:
a first section configured for item transfer in the depth direction and a second section configured for item transfer in the vertical direction;
side rails extending along the depth axis and spaced apart to receive the item therebetween, the side rails extending along the first section and the second section; and
a bottom rail disposed in the first section and configured to support the item.

11. The transfer apparatus of claim 9, wherein the claw assembly comprises:
a first claw element with a top end attached to one side rail of the side rails of the item carriage; and
a second claw element with a top end attached to the other side rail of the side rails of the item carriage,
wherein the first claw element and the second claw element are disposed along the second section of the item carriage.

12. The transfer apparatus of claim 7, wherein the first section of the item carriage is supported by the upright frame and the second section of the item carriage extends beyond the upright frame in the depth direction.

13. The transfer apparatus of claim 6, wherein the header further comprises:
an extractor carriage slidably coupled to the item carriage, wherein the extractor is attached to the extractor carriage.

14. The transfer apparatus of claim 5, further comprising:
a second header movably coupled to the upright frame and positioned on a side opposite of the header, the second header and the header being structurally the same as one another.

15. The transfer apparatus of claim 14, wherein the second header and the header are aligned along bottom sides thereof and configured to move simultaneously along the vertical direction on the upright frame.

16. A method of operating a transfer apparatus for transferring items, the method comprising:
moving a transfer apparatus in a lateral direction to an assigned storage location of an item, the transfer apparatus comprising a laterally movable frame, a upright frame attached to the laterally movable frame, and a header movably coupled to the upright frame, the header comprising an extractor and a claw assembly;
translating the header of the transfer apparatus in a vertical direction to align with the item to be extracted;
extending the extractor of the header along a depth direction to engage with the item, the depth direction being perpendicular to the vertical direction and the lateral direction;
retracting the extractor to position the item over the claw assembly of the header;
moving the transfer apparatus in the lateral direction to align the header with an assigned delivery location of the item; and
actuating the claw assembly to drop off the item at the assigned delivery location.

17. The method of claim 16, wherein moving the transfer apparatus to the assigned delivery location further comprises:
moving the header in the vertical direction to align the claw assembly of the header over the assigned delivery location.

18. The method of claim 17, further comprising:
actuating the claw assembly to pick up a second item from the assigned delivery location or another assigned delivery location;
moving the transfer apparatus to the assigned storage location or another assigned storage location; and
extending the extractor of the header to push the second item into a compartment of an inventory holder.

19. The method of claim 17, further comprising:
simultaneously picking and delivering items using a two-headed configuration of the transfer apparatus, wherein the two-headed configuration of the transfer apparatus includes a second header that is structurally the same as the header and positioned laterally adjacent to the header.

20. The method of claim 19, wherein simultaneously picking and delivering comprises:
moving the transfer apparatus so that the header is aligned with the assigned delivery location and so that the second header is aligned with a second item at the assigned delivery location;
actuating the transfer apparatus to release the item from the header and to pick using the second header, the second item;
moving the transfer apparatus to the assigned storage location; and
delivering the second item in the second header at the assigned storage location.

* * * * *